United States Patent
Wang

(10) Patent No.: US 10,332,517 B1
(45) Date of Patent: Jun. 25, 2019

(54) PRIVACY MODE BASED ON SPEAKER IDENTIFIER

(71) Applicant: Amazon Technologies, Inc., Seattle, WA (US)

(72) Inventor: Zhenhua Wang, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 186 days.

(21) Appl. No.: 15/612,723

(22) Filed: Jun. 2, 2017

(51) Int. Cl.
| | |
|---|---|
| *G06F 3/16* | (2006.01) |
| *G10L 15/22* | (2006.01) |
| *G10L 15/26* | (2006.01) |
| *G10L 17/00* | (2013.01) |
| *G10L 15/02* | (2006.01) |
| *G10L 17/22* | (2013.01) |
| *G10L 15/18* | (2013.01) |
| *G06F 21/64* | (2013.01) |

(52) U.S. Cl.
CPC .............. *G10L 15/22* (2013.01); *G06F 3/167* (2013.01); *G06F 21/64* (2013.01); *G10L 15/02* (2013.01); *G10L 15/1815* (2013.01); *G10L 15/26* (2013.01); *G10L 17/22* (2013.01); *G10L 17/00* (2013.01); *G10L 2015/223* (2013.01)

(58) Field of Classification Search
CPC ......... G10L 15/26; G10L 15/22; G10L 17/00; G06F 3/167
See application file for complete search history.

(56) References Cited

U.S. PATENT DOCUMENTS

| | | | | |
|---|---|---|---|---|
| 8,402,011 | B1* | 3/2013 | Bodenhamer | G06F 16/986 707/706 |
| 9,166,982 | B1* | 10/2015 | Etesse | H04L 63/102 |
| 10,074,371 | B1* | 9/2018 | Wang | G10L 15/22 |
| 2002/0085698 | A1* | 7/2002 | Liebenow | H04M 1/665 379/207.13 |
| 2008/0028444 | A1* | 1/2008 | Loesch | G06F 21/606 726/4 |
| 2010/0218187 | A1* | 8/2010 | Pasupathilingam | G06F 9/542 718/100 |
| 2012/0185949 | A1* | 7/2012 | Phillips | G06F 21/6263 726/26 |
| 2012/0198524 | A1* | 8/2012 | Celebisoy | G06F 21/6263 726/5 |

(Continued)

*Primary Examiner* — Samuel G Neway
(74) *Attorney, Agent, or Firm* — Pierce Atwood LLP

(57) ABSTRACT

Techniques for configuring a speech processing system with a privacy mode that is associated with the identity of a user that activated the privacy mode are described. A user may speak an indication to have the speech processing system activate a privacy mode. When such an indication is detected by the speech processing system, the speech processing system determines an identity of the user, determines a unique system identifier associated with the user, and generates a privacy mode flag. The speech processing system then associates the privacy mode flag with the user's unique system identifier. The privacy mode flag indicates to components of the speech processing system that any data related to processing of the user's utterances should not be sent to long term storage, thus causing various components of the system to delete data once the respective component is finished processing with respect to an utterance of the user.

20 Claims, 18 Drawing Sheets

(56) References Cited

U.S. PATENT DOCUMENTS

| | | | | |
|---|---|---|---|---|
| 2012/0240237 A1* | 9/2012 | Kanevsky | ............ | G06F 16/957 |
| | | | | 726/26 |
| 2014/0214919 A1* | 7/2014 | Taylor | ................ | H04L 67/2814 |
| | | | | 709/203 |
| 2014/0372126 A1* | 12/2014 | Ady | ........................ | G10L 25/48 |
| | | | | 704/270.1 |
| 2017/0339248 A1* | 11/2017 | Karalis | ................ | G06F 16/957 |
| 2017/0366967 A1* | 12/2017 | Yang | ....................... | H04L 67/02 |

* cited by examiner

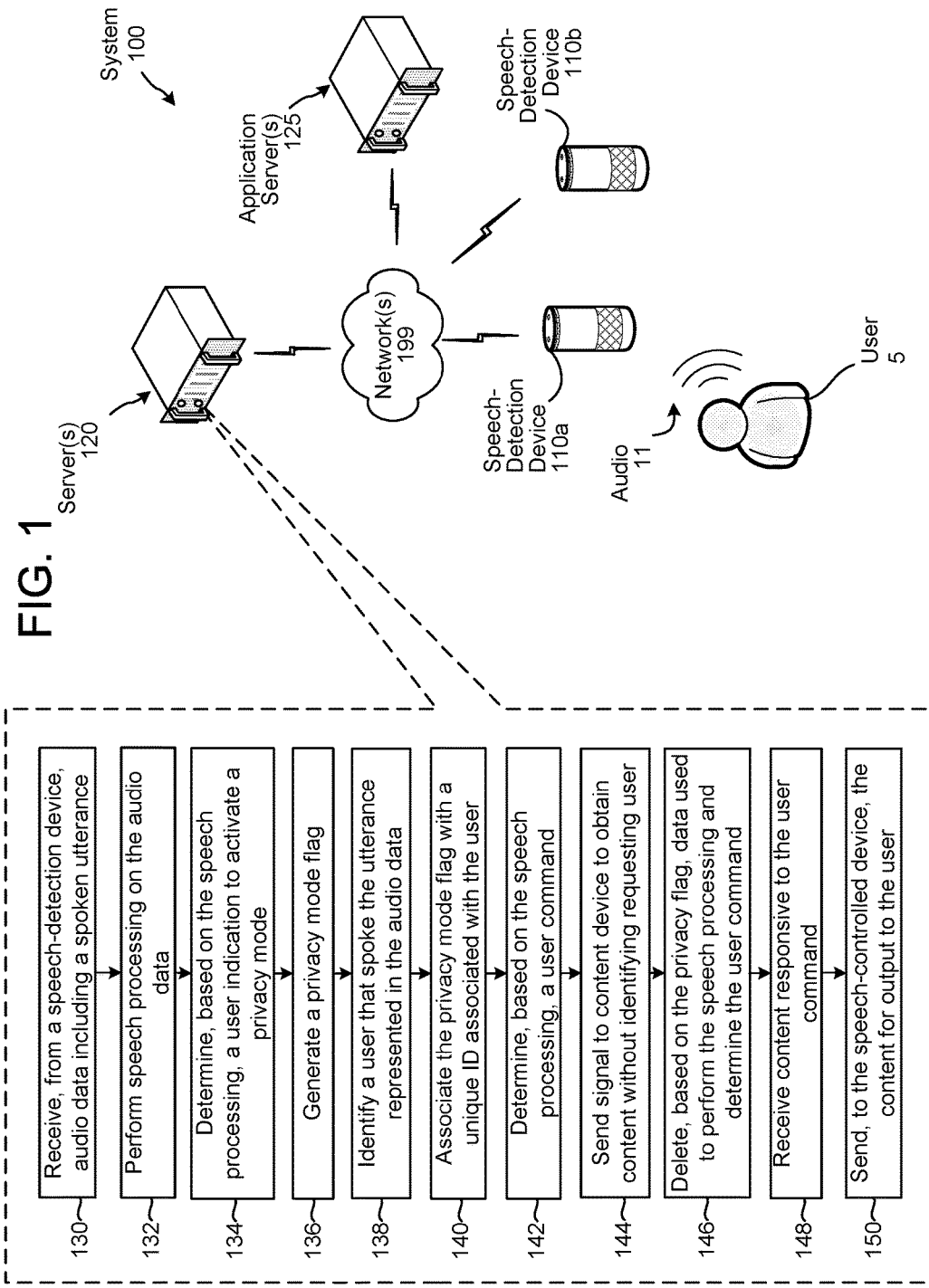

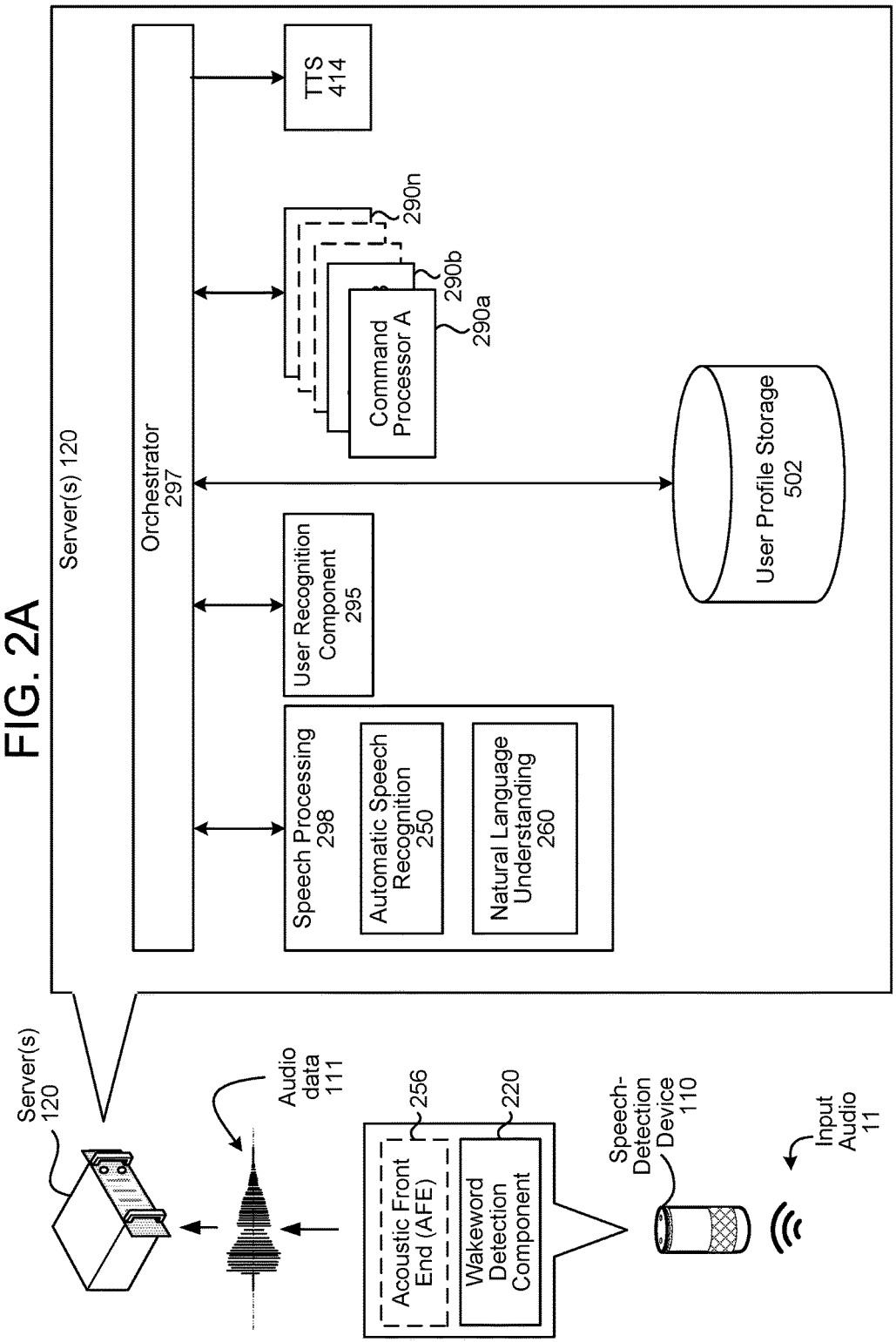

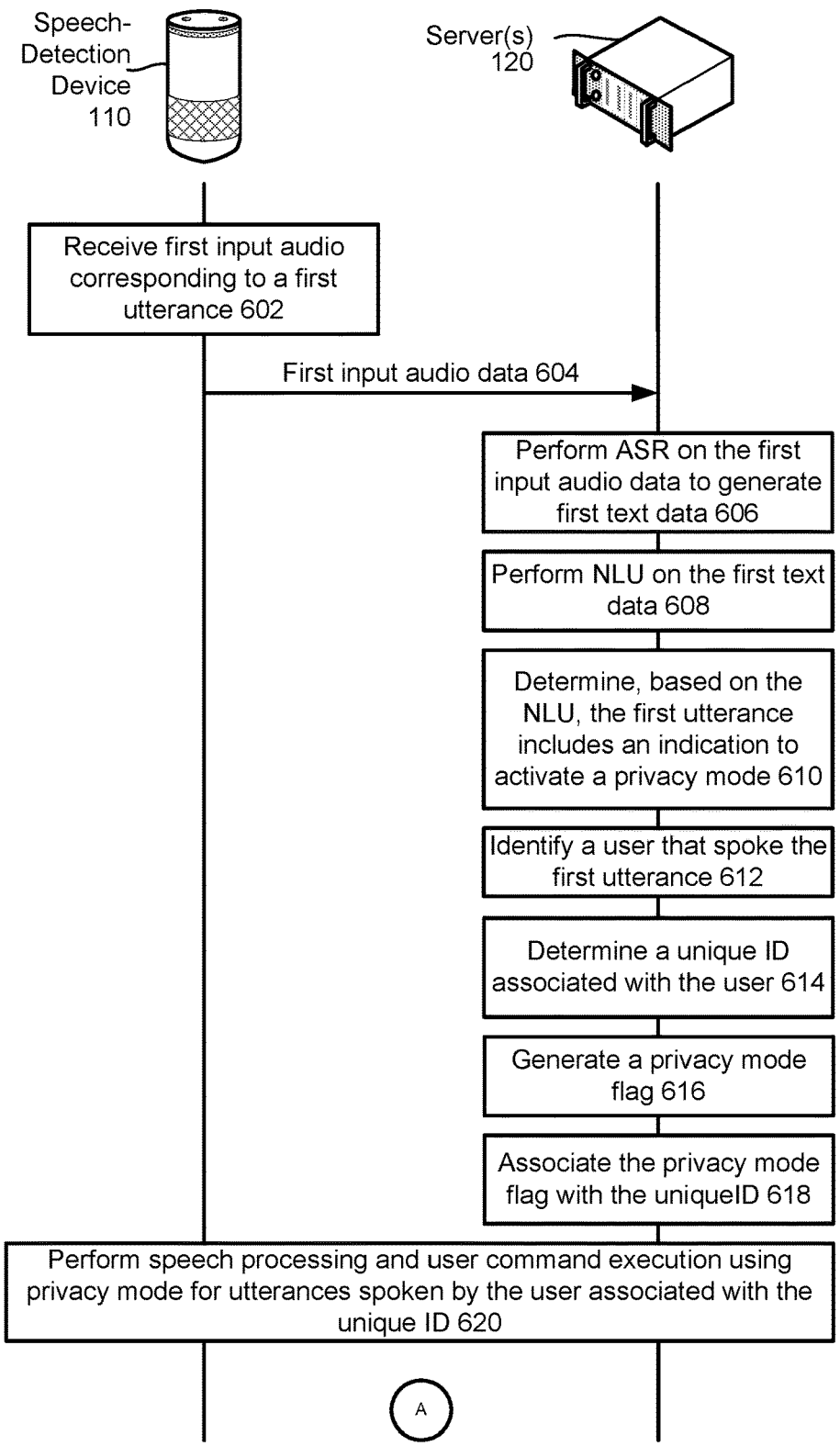

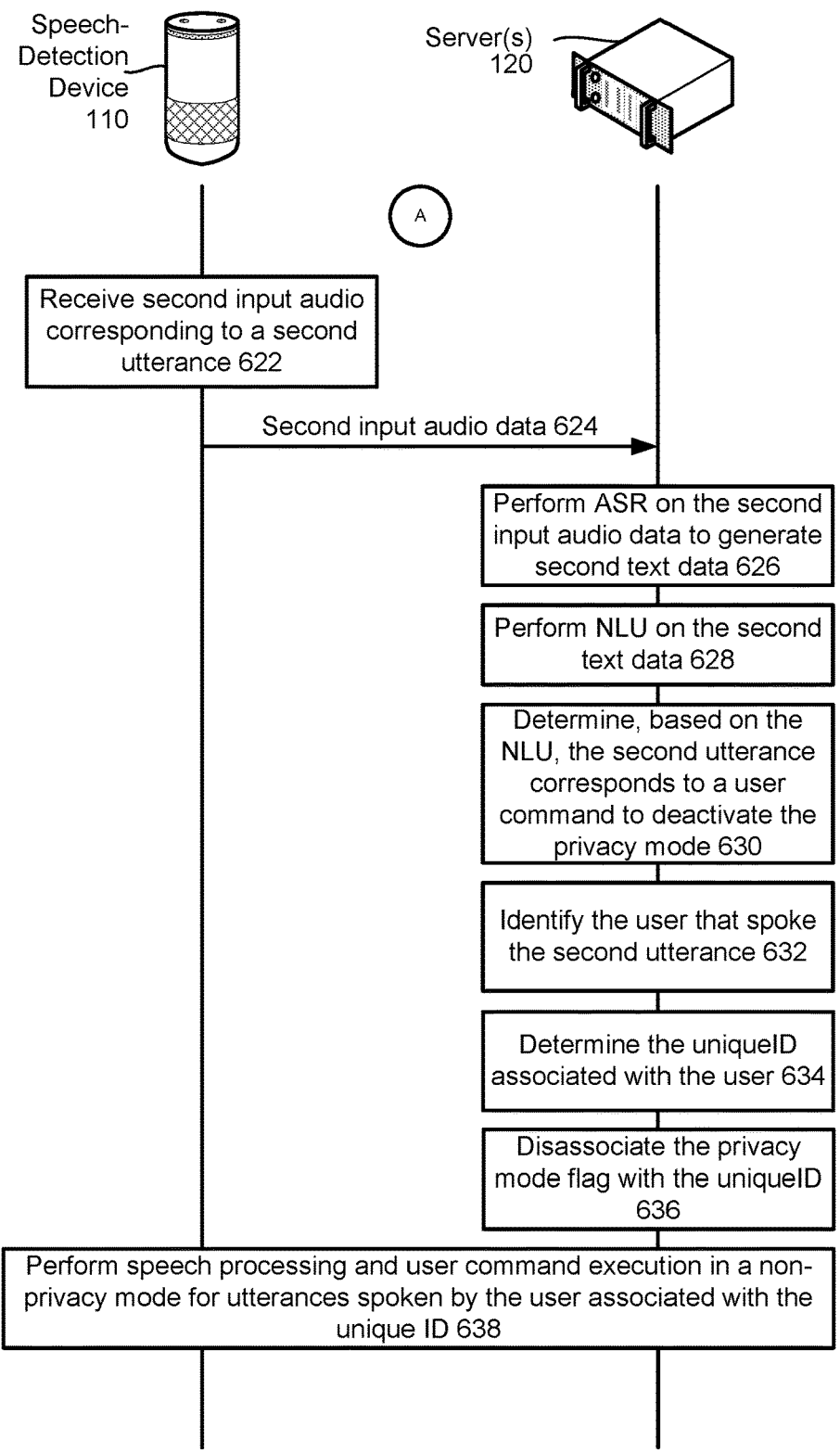

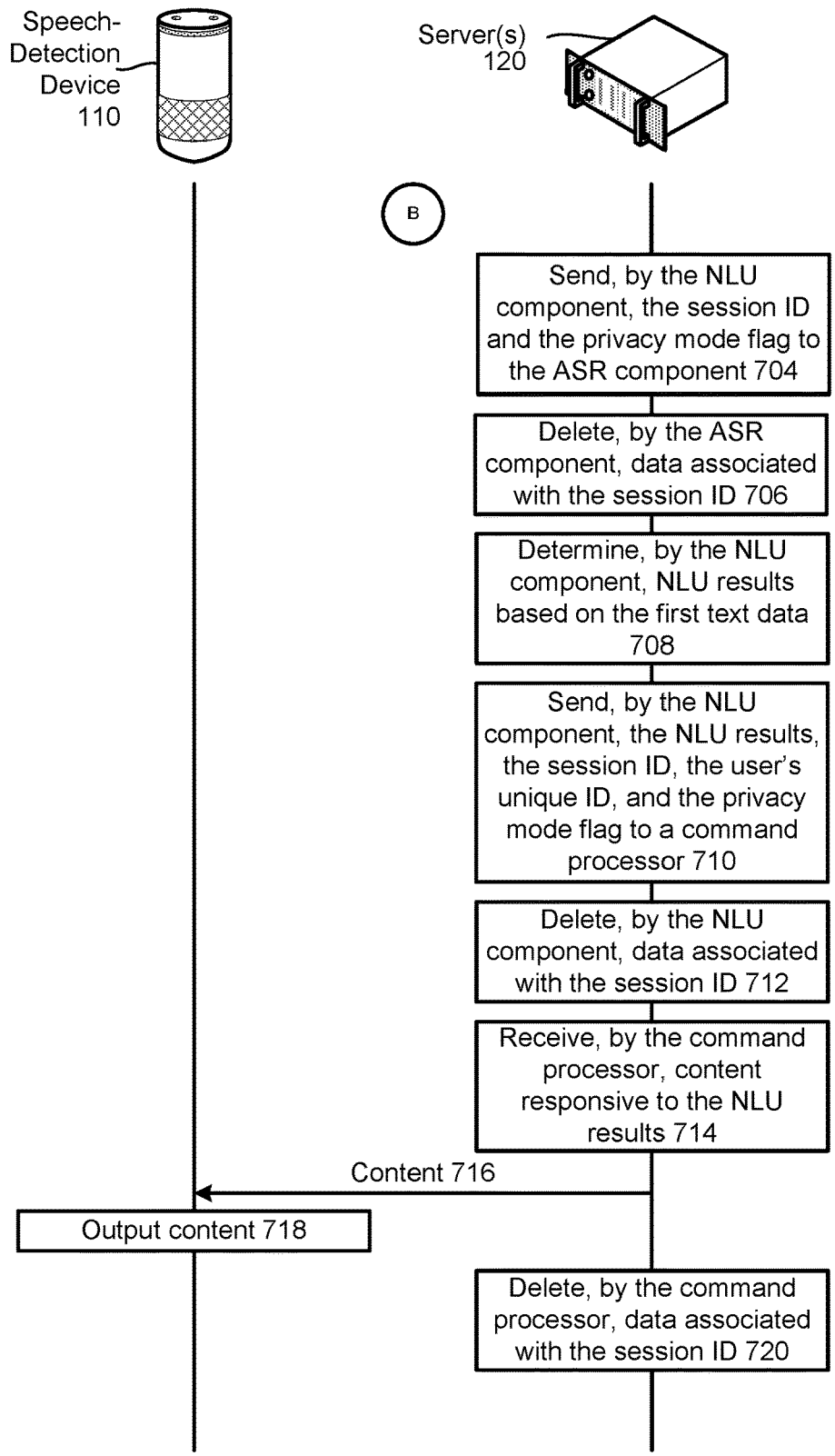

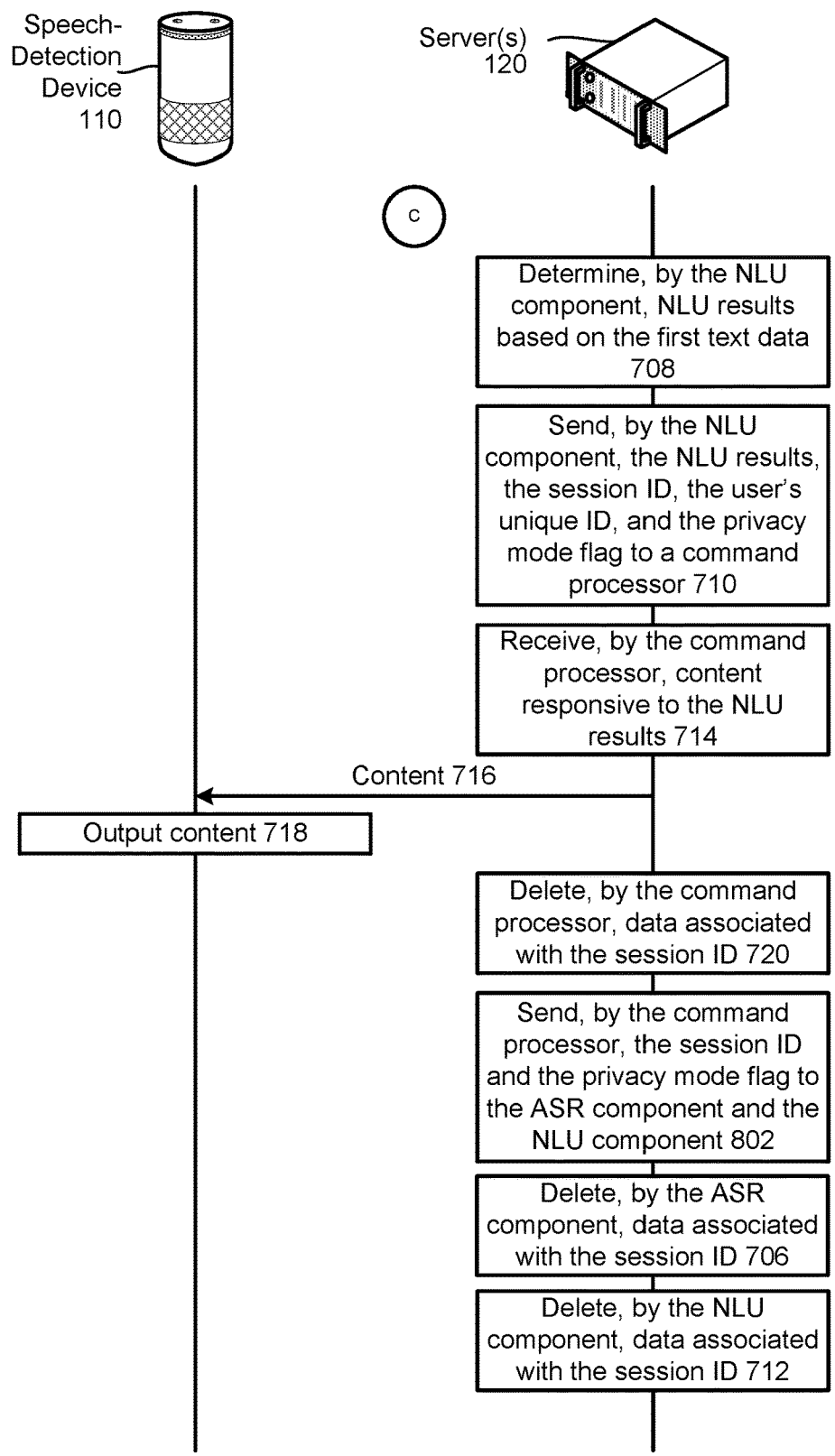

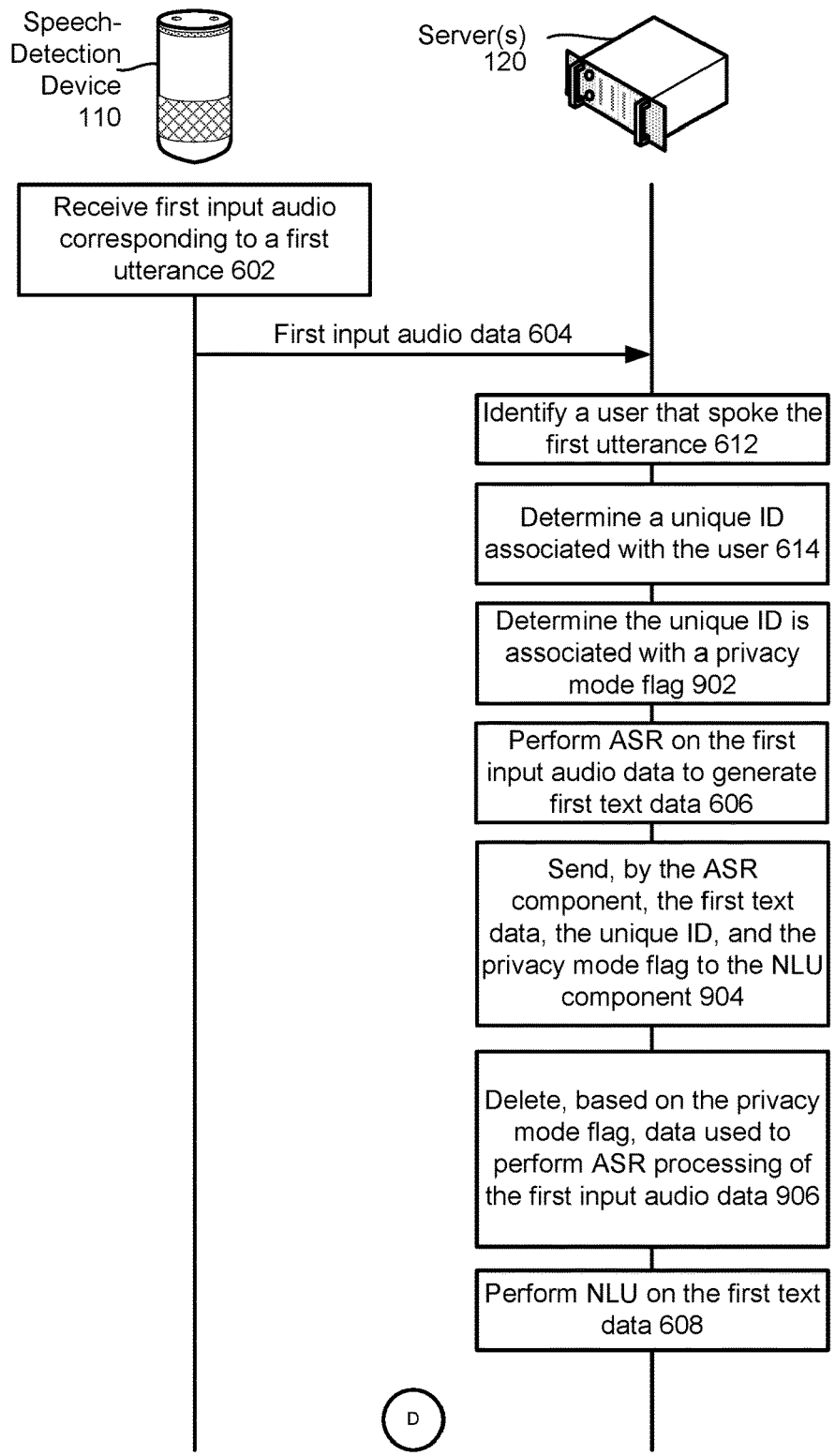

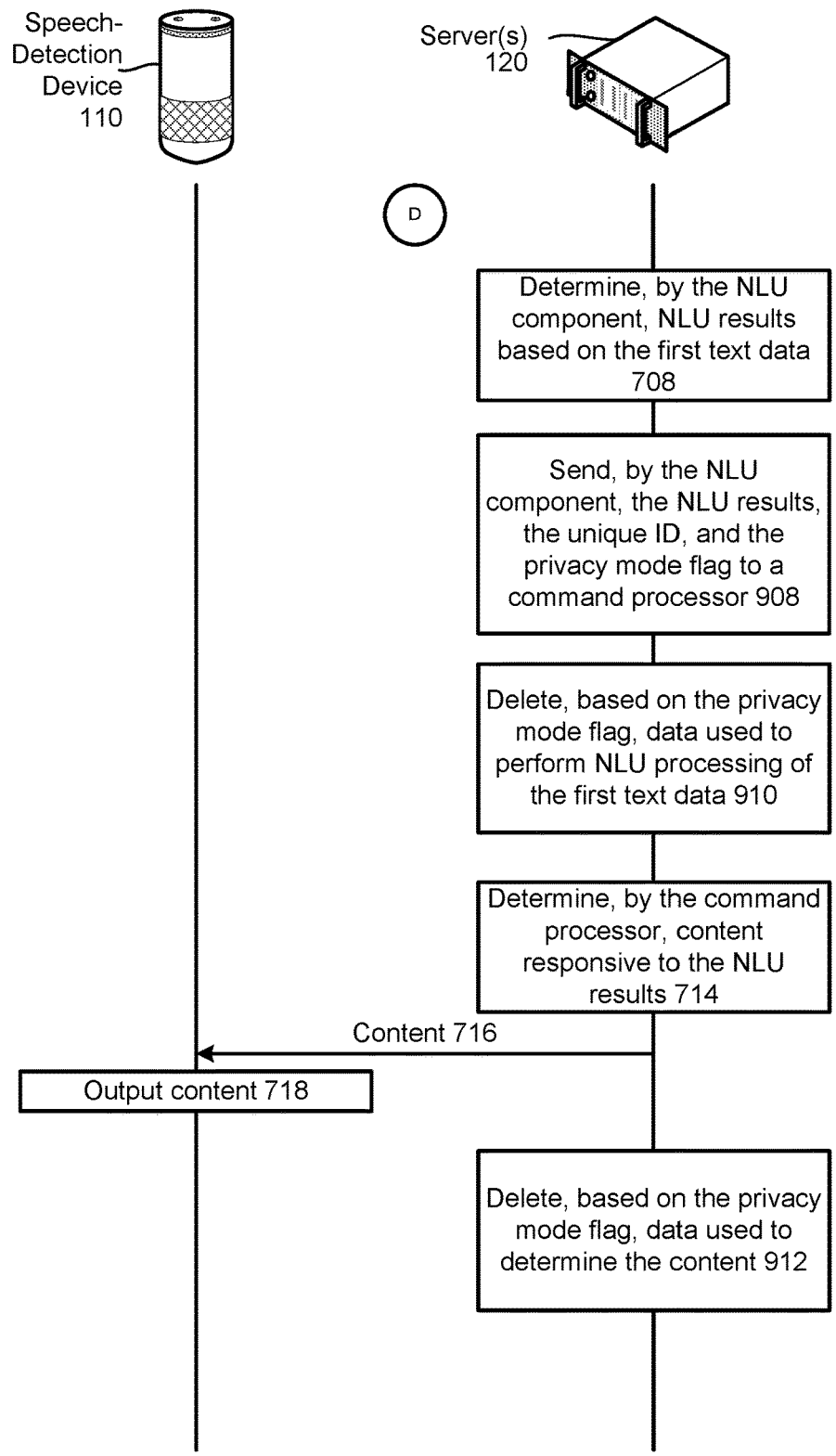

PRIVACY MODE BASED ON SPEAKER IDENTIFIER

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1 illustrates a speech processing system that configures executes a privacy mode with respect to user identity according to embodiments of the present disclosure.

FIG. 2A is a diagram of components of a speech processing system according to embodiments of the present disclosure.

FIGS. 6A and 6B are a signal flow diagram illustrating activation, processing with respect to, and deactivation of a privacy mode associated with a user's unique ID according to embodiments of the present disclosure.

FIGS. 7A and 7B are a signal flow diagram illustrating the processing of a user command using privacy mode according to embodiments of the present disclosure.

FIGS. 8A and 8B are a signal flow diagram illustrating the processing of a user command using privacy mode according to embodiments of the present disclosure.

FIGS. 9A and 9B are a signal flow diagram illustrating the processing of a user command spoken subsequently to the user activating privacy mode according to embodiments of the present disclosure.

DETAILED DESCRIPTION

Figure 2B:
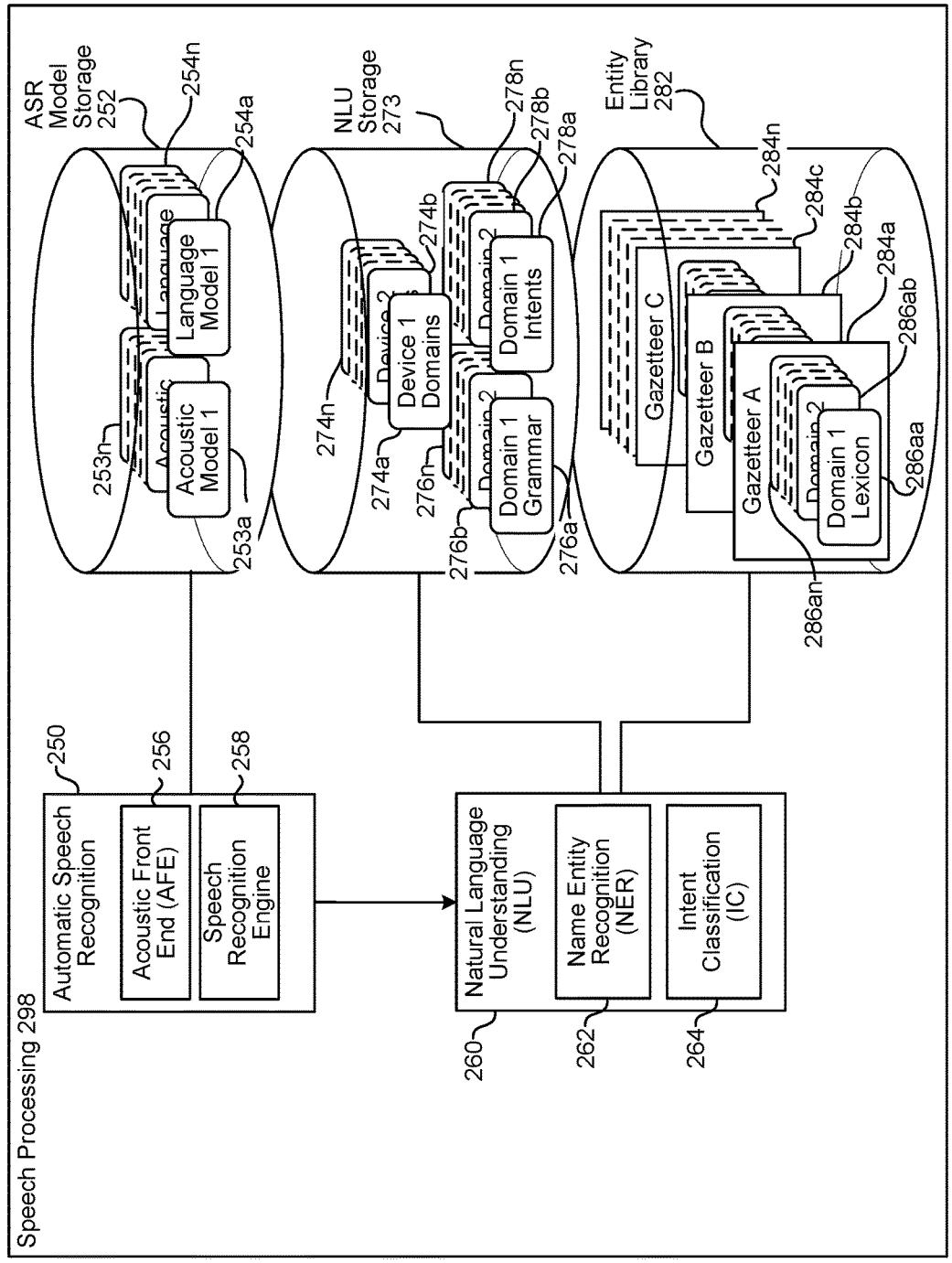
FIG. 2B is a diagram of components of a speech processing system according to embodiments of the present disclosure.

Automatic speech recognition (ASR) is a field of computer science, artificial intelligence, and linguistics concerned with transforming audio data associated with speech into text data representative of that speech. Similarly, natural language understanding (NLU) is a field of computer science, artificial intelligence, and linguistics concerned with enabling computers to derive meaning from text input containing natural language. Likewise, text-to-speech (TTS) is a field of computer science, artificial intelligence, and linguistics concerned with enabling computers to output synthesized speech. ASR, NLU, and TTS are often used together as part of a speech processing system.

Internet browsers are commonly defaulted to maintain a history of user browsing. However, internet browsers may also allow users to enable a privacy mode in which the internet browser does not save a history of the operations performed via the internet while the privacy mode is activated. Users may enable and disable a privacy mode of an internet browser by activating and deactivating an input field, such as an electronic toggle or the like. The privacy mode of internet browsers is typically not associated with the identity of a particular user. For example, a first user may enable a privacy mode of an internet browser and forget to disable the privacy mode prior to the first user completing its browsing session. Thereafter, a second user may initiate a browsing session. Since the first user did not deactivate the privacy mode, the privacy mode remains active during the second user's browsing session. This may be undesirable because the second user may desire the internet browser to personalize to the second user's preferences, but the privacy mode may prevent such personalization. Such privacy mode problems may also exist with regard to a speech-controlled system, particularly with how the system is voice controlled to enter and exit a privacy mode.

The present disclosure fixes the aforementioned, as well as other, problems by configuring a speech processing system with a privacy mode that is associated with the identity of the user that activated the privacy mode. A user may speak an indication to have the speech processing system activate a privacy mode. When such an indication is detected by the speech processing system, the speech processing system determines an identity of the user, determines a unique system identifier associated with the user, and generates a privacy mode flag or other indicator. The speech processing system then associates the privacy mode flag with the user's unique system identifier. The privacy mode flag indicates to components of the speech processing system that any data related to processing of the user's utterances should not be sent to long term storage. That is, the privacy mode flag may cause each component to delete data associated with the user's utterance after the component has finished processing with respect to the user's utterance. The system may track the privacy mode for the user across individual speech capture devices (for example, multiple devices in a user's home), such that the user may activate the privacy mode when speaking to a first local device, and later speech from the same user to a second local device may also be treated as within the privacy mode.

The present disclosure allows users having system unique identifiers associated with privacy mode flags to interact with the speech processing system in a privacy mode, while allowing other users having system unique identifiers not associated with privacy mode flags to interact with the speech processing system in a non-privacy mode. When a user speaks an utterance to the speech processing system, the speech processing system may determine an identity of the user, determine a system unique identifier associated with the user, and determine whether the user's system unique identifier is associated with a privacy mode flag. Thus, the speech processing system only processes a user's utterance in privacy mode if the unique system identifier of the user is associated with a privacy mode flag. It should also be appreciated that multiple users' unique system identifiers may be associated with privacy mode flags at a given point in time.

FIG. 1 shows a speech processing system 100 capable of executing a privacy mode with respect to user identity as described herein. Although the figures and discussion illustrate certain operational steps of the system 100 in a particular order, the steps described may be performed in a different order (as well as certain steps removed or added) without departing from the intent of the disclosure. As shown in FIG. 1, the system 100 may include one or more speech-detection devices 110 local to a user 5, as well as one or more networks 199 and one or more servers 120 connected to the speech-detection device(s) 110 across the network(s) 199. The server(s) 120 (which may be one or more different physical devices) may be capable of performing traditional speech processing (e.g., ASR, NLU, command processing, etc.) as well as other operations as described herein. A single server 120 may perform all speech processing or multiple servers 120 may combine to perform all speech processing. Further, the server(s) 120 may execute certain commands, such as answering spoken utterances of users 5 and operating other devices (e.g., light switches, appliances, etc.). In addition, certain speech detection or command execution functions may be performed by the speech-detection device 110. Further, the system 100 may be in communication with external data sources, such as a knowledge base, external service provider devices (e.g., application servers 125), or the like.

As shown in FIG. 1, a speech-detection device 110 may receive audio 11 including a spoken utterance of a user 5 via a microphone (or array of microphones) of the speech-detection device 110. The speech-detection device 110 generates audio data corresponding to the received audio 11, and sends the audio data to the server(s) 120 for processing.

The server(s) 120 receives (130) the audio data from the speech-detection device 110. The server(s) 120 performs (132) speech processing on the audio data and, based on the speech processing, determines (134) a user indication to activate a privacy mode. The indication may be in the form of user speech.

The indication may be located within the audio data serially with a user command. Such an indication may correspond to the user stating "enter privacy mode," "enter privacy mode for me," "please enter privacy mode," or the like. For example, the audio data may include speech corresponding to "enter privacy mode" as well as speech corresponding to a user command such as "tell me a joke." The indication may be located before or after the user command within the audio data.

The indication may alternatively be located within the user command in the audio data. The indication may take the form of a trigger word(s) in the user command. For example, the audio data may include speech corresponding to "privately, tell me a joke," "tell me a joke privately," or the like. In the aforementioned example, "privately" is the privacy mode trigger word. It should be appreciated that other trigger words are possible. The number of trigger words recognizable by the server(s) 120 may depend on system configurations.

The server(s) 120, upon determining the indication, generates (136) a privacy mode flag. The privacy mode flag indicates to components of the speech processing system that any data related to processing of the user's utterances should not be sent to long term storage until the user indicates privacy mode should be deactivated. That is, the privacy mode flag may cause each component to delete data associated with the user's utterance after the component has finished processing with respect to the user's utterance until the user indicates privacy mode should be deactivated.

The server(s) 120 identify (138) a user that spoke the utterance represented in the audio data. Determining the user may involve comparing speech characteristics in the audio data to stored speech characteristics of users of the speech processing system 100. Determining the user may also involve comparing biometric data (e.g., fingerprint data, iris data, etc.) of the user to stored biometric data of users of the speech processing system 100. Determining the user may further involve comparing image data including a representation of a feature of the user with stored image data including representations of features of users of the speech processing system 100. Other kinds of user recognition processes, including those known in the art, may also be used. The server(s) 120 may perform the aforementioned comparisons with respect to stored data associated with all the users of the speech processing system 100. If the speech processing system 100 has a lot of users, performing the aforementioned comparisons with respect to all the users may be computer intensive and time consuming. In order to speed up the comparisons, the server(s) 120 may perform the above comparisons with respect to those users associated with the speech-detection device 110 from which the audio data was received. The server(s) 120 associates (140) the generated privacy mode flag with a unique ID associated with the determined user.

The server(s) 120 determines (142) a user command based on the speech processing of the audio data. The server(s) 120 may also identify a device corresponding to a source of the content. The server(s) 120 may, if needed, use the identity of the in order to determine the appropriate content/content source. For example, if the utterance includes "play my playlist privately" the server(s) 120 may determine and use the user's identity to resolve the words "my playlist" to appropriately identify the playlist and source of the playlist. The server(s) 120 may then send (144) a signal to the content device to obtain the desired content, where the signal does not indicate the identity of the requesting user. The privacy mode flag may cause the server(s) 120 to delete (146), upon completing the speech processing, data used to perform the speech processing and determine the user command. Deleting the data after speech processing is complete allows the server(s) 120 to determine a user command specific to the user's usage history, while preventing the present speech processing to not be added to the user's usage history.

The server(s) 120 may then receive (148) content responsive to the user command. The content may be received from either a first party (1P) application (such as one controlled or managed by the server(s) 120) or a third party (3P) application (such as one managed by an application server(s) 125 in communication with the server(s) 120 but not controlled or managed by the server(s) 120). The content may be received as text data from the content source. If received as text data, the server(s) 120 may perform TTS on the text data to generate output audio data. The content may alternatively be received as audio data from the content source, in which case the server(s) 120 may not need to perform TTS in order to get the received audio data into a format that may be output by the speech-detection device 110. The server(s) 120 sends (150) the content (e.g., output audio data) to the speech-detection device 110 (or another device indicated in the profile of the user that spoke the utterance). The speech-detection device 110 (or other device) outputs audio corresponding to the content to the user 5.

The privacy mode, once affiliated with the user 5, may operate across speech-detection devices 110. For example, the user 5 may activate privacy mode by engaging a first speech-detection device 110a. Thereafter, the user 5 may engage a second speech-detection device 110b. If the user 5 has not deactivate privacy mode prior to engaging the second speech-detection device 110b, the speech-detection device 110b and/or server(s) 120 will process the user's command using privacy mode.

In some situations, activation of the privacy mode may be retroactive. For example, the user 5 may speak a command, and the system may provide responsive content. Thereafter, the user may say to the speech-detection device 110 "make that last utterance private." In this case, the server(s) 120 can cause components of the system (e.g., ASR component 250, NLU component 260, command processor 290, TTS component 414, etc. described herein) to delete data used to process the last utterance. In some instances, an intermediary user may speak an utterance to the system prior to the user 5 saying "make that last utterance private." In order to ensure user's cannot activate privacy mode with respect to other users, the system 100 may determine the user's identity and, in response to receiving the utterance "make that last utterance private," determine the last utterance spoken by that particular user, and cause data to be deleted with respect to that utterance.

The system 100 of FIG. 1 may operate using various speech processing components as described in FIGS. 2A and 2B. The various components illustrated may be located on a same or different physical devices. Communication between various components illustrated in FIGS. 2A and 2B may occur directly or across a network(s) 199. An audio capture component, such as a microphone (or array of microphones) of the speech-detection device 110 (or other device), captures input audio 11 corresponding to a spoken utterance. The speech-detection device 110, using a wakeword detection component 220, processes audio data corresponding to the input audio 11 to determine if a keyword (such as a wakeword) is detected in the audio data. Following detection of a wakeword, the speech-detection device 110 sends audio data 111, corresponding to the utterance, to a server(s) 120 for processing. The audio data 111 may be output from an acoustic front end (AFE) 256 located on the speech-detection device 110 prior to transmission, or the audio data 111 may be in a different form for processing by a remote AFE 256, such as the AFE 256 located with an ASR component 250 of the server(s) 120.

The wakeword detection component 220 works in conjunction with other components of the speech-detection device 110, for example a microphone to detect keywords in audio data corresponding to the input audio 11. For example, the speech-detection device 110 may convert input audio 11 into audio data, and process the audio data with the wakeword detection component 220 to determine whether speech is detected, and if so, if the audio data comprising speech matches an audio signature and/or model corresponding to a particular keyword.

The speech-detection device 110 may use various techniques to determine whether audio data includes speech. Some embodiments may apply voice activity detection (VAD) techniques. Such techniques may determine whether speech is present in audio data based on various quantitative aspects of the audio data, such as a spectral slope between one or more frames of the audio data; energy levels of the audio data in one or more spectral bands; signal-to-noise ratios of the audio data in one or more spectral bands; or other quantitative aspects. In other embodiments, the speech-detection device 110 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio data to one or more acoustic models in speech storage, which acoustic models may include models corresponding to speech, noise (such as environmental noise or background noise), or silence. Still other techniques may be used to determine whether speech is present in audio data.

Once speech is detected in the audio data, the speech-detection device 110 may use the wakeword detection component 220 to perform wakeword detection to determine when a user intends to speak a command to the speech-detection device 110. This process may also be referred to as keyword detection, with the wakeword being a specific example of a keyword. Specifically, keyword detection is typically performed without performing linguistic analysis, textual analysis, or semantic analysis. Instead, audio data is analyzed to determine if specific characteristics of the audio data match preconfigured acoustic waveforms, audio signatures, or other data to determine if the incoming audio data "matches" stored audio data corresponding to a keyword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching conducted in resulting lattices or confusion networks. LVCSR decoding may require relatively high computational resources. Another approach for wakeword spotting builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in a decoding graph, and the decoding output is further processed to make the decision on keyword presence. This approach can be extended to include discriminative information by incorporating a hybrid deep neural network (DNN)-HMM decoding framework. In another embodiment, the wakeword spotting system may be built on DNN/recursive neural network (RNN) structures directly, without MINI involved. Such a system may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected in the audio data, the speech-detection device 110 may "wake" and begin transmitting audio data 111 corresponding to input audio 11 to the server(s) 120 for speech processing (e.g., for purposes of executing a command in the speech). The audio data 111 may include data corresponding to the wakeword, or the portion of the audio data corresponding to the wakeword may be removed by the speech-detection device 110 prior to sending the audio data 111 to the server(s) 120.

Upon receipt by the server(s) 120, an orchestrator component 297 sends the audio data 111 to a speech processing component 298, and namely an ASR component 250 of the speech processing component 298. The ASR component 250 transcribes the audio data 111 into text data representing words of speech contained in the audio data 111. The text data may then be used by other components for various purposes, such as executing system commands, inputting data, etc. A spoken utterance in the audio data 111 is input to a processor configured to perform ASR, which then interprets the spoken utterance based on a similarity between the spoken utterance and pre-established language models 254 stored in an ASR model knowledge base (i.e., an ASR model storage 252). For example, the ASR component 250 may compare the audio data 111 with models for sounds (e.g., subword units or phonemes) and sequences of sounds to identify words that match the sequence of sounds spoken in the utterance of the audio data 111.

The different ways a spoken utterance may be interpreted (i.e., the different hypotheses) may each be assigned a respective probability/confidence score representing a likelihood that a particular set of words matches those spoken in the utterance. The confidence score may be based on a number of factors including, for example, a similarity of the sound in the spoken utterance to models for language sounds (e.g., an acoustic model 253 stored in the ASR model storage 252), and a likelihood that a particular word that matches the sound would be included in the sentence at the specific location (e.g., using a language model 254 stored in the ASR model storage 252). Thus, each potential textual interpretation of the spoken utterance (i.e., hypothesis) is associated with a confidence score. Based on the considered factors and the assigned confidence score, the ASR component 250 outputs the most likely text data corresponding to the audio data 111. The ASR component 250 may also output multiple hypotheses in the form of a lattice or an N-best list with each hypothesis corresponding to a confidence score or other score (e.g., such as probability scores, etc.).

The server(s) 120 including the ASR component 250 may include an AFE 256 and a speech recognition engine 258. The AFE 256 transforms audio data 111 into data for processing by the speech recognition engine 258. The speech recognition engine 258 compares the speech recognition data with acoustic models 253, language models 254, and other data models and information for recognizing the speech conveyed in the audio data 111. The AFE 256 may reduce noise in the audio data 111 and divide the digitized audio data 111 into frames representing time intervals for which the AFE 256 determines a number of values (i.e., features) representing qualities of the audio data 111, along with a set of those values (i.e., a feature vector or audio feature vector) representing features/qualities of the audio data 111 within each frame. In one configuration, each audio frame includes 25 ms of audio data and the frames start at 10 ms intervals resulting in a sliding window where adjacent audio frames include 15 ms of overlapping audio data. Many different features may be determined, as known in the art, and each feature represents some quality of the audio data 111 that may be useful for ASR processing. A number of approaches may be used by the AFE 256 to process the audio data 111, such as mel-frequency cepstral coefficients (MFCCs), perceptual linear predictive (PLP) techniques, neural network feature vector techniques, linear discriminant analysis, semi-tied covariance matrices, or other approaches known to those skilled in the art.

The speech recognition engine 258 may process data output from the AFE 256 with reference to information stored in the ASR model storage 252. Alternatively, post-AFE processed data (e.g., feature vectors) may be received by the device executing ASR processing from another source besides the internal AFE 256. For example, the speech-detection device 110 may process audio data 111 into feature vectors (e.g., using an on-device AFE 256) and transmit the feature vector data to the server(s) 120, across the network(s) 199, for ASR processing. Feature vector data may arrive at the server(s) 120 encoded, in which case it may be decoded prior to processing by the processor executing the speech recognition engine 258.

The speech recognition engine 258 attempts to match received feature vectors to language phonemes and words as known in the stored acoustic models 253 and language models 254. The speech recognition engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving a likelihood that the ASR component 250 will output text data representing speech that makes sense grammatically.

The speech recognition engine 258 may use a number of techniques to match feature vectors to phonemes, for example using HMMs to determine probabilities that feature vectors may match phonemes. Sounds received may be represented as paths between states of the HMM and multiple paths may represent multiple possible text matches for the same sound.

Following ASR processing, the ASR results (i.e., text data representing speech) may be sent by the speech recognition engine 258 to the orchestrator 297 or other processing components, which may be local to the device performing ASR and/or distributed across the network(s) 199. For example, ASR results in the form of a single textual representation of the speech, an N-best list including multiple hypotheses and respective scores, lattice, etc. may be sent from the ASR component 250 to an NLU component 260 either directly or indirectly through the orchestrator component 297.

The device performing NLU processing (e.g., the server(s) 120) may include various components, including potentially dedicated processor(s), memory, storage, etc. The device performing NLU processing may include a dedicated NLU component 260, which may include a named entity recognition (NER) component 262 and an intent classification (IC) component 264. The device performing NLU processing may additionally include NLU storage 273, and a knowledge base (not illustrated). The knowledge base is a database or other information storage that may include information about entities that may be used in resolving spoken utterances. The NLU component 260 may also utilize gazetteer information 284 stored in an entity library storage 282. The knowledge base and/or gazetteer information 284 may be used for entity resolution, for example matching ASR results with different entities (e.g., song titles, contact names, etc.). Gazetteers 284 may be linked to users (e.g., a particular gazetteer may be associated with a specific user's music collection), may be linked to certain domains (e.g., shopping), or may be organized in a variety of other ways. Domain, as used herein, may refer to a category of content, such as music, videos, weather, etc.

The NLU component 260 takes text data (e.g., output from the ASR component 250) and attempts to make a semantic interpretation of the text data. That is, the NLU component 260 determines the meaning behind the text data based on the individual words and then implements that meaning. The NLU component 260 interprets a text string to derive an intent or a desired action from the user as well as the pertinent pieces of information in the text data that allow a device (e.g., the speech-detection device 110, the server(s) 120, an application server 125, etc.) to complete that action. For example, if a spoken utterance is processed using the ASR component 250, which outputs the text data "call mom", the NLU component 260 may determine the user intended to activate a telephone in his/her device and to initiate a call with a contact matching the entity "mom."

The NLU component 260 may process several textual inputs related to the same utterance. For example, if the ASR component 250 outputs N text segments (e.g., as part of an N-best list), the NLU component 260 may process all N outputs to obtain NLU results.

The NLU component 260 may be configured to parse and tag to annotate text data as part of NLU processing. For example, for the text data "call mom," the NLU component 260 may tag "call" as a command (e.g., to execute a phone call) and may tag "mom" as a specific entity and target of the command. In addition, the telephone number for the entity corresponding to "mom" stored in a contact list may be included in the annotated NLU results.

To correctly perform NLU processing of an utterance, the NLU component 260 may be configured to determine a "domain" of the utterance so as to determine and narrow down which services offered by an endpoint device (e.g., the server(s) 120, the speech-detection device 110, an application server(s) 125, etc.) may be relevant. For example, an endpoint device may offer services relating to interactions with a telephone service, a contact list service, a calendar/scheduling service, a music player service, etc. Words in text data may implicate more than one service, and some services may be functionally linked (e.g., both a telephone service and a calendar service may utilize data from the contact list).

The NER component 262 receives an utterance in the form of ASR results and attempts to identify relevant grammars and lexical information that may be used to construe meaning. To do so, the NER component 262 may begin by identifying potential domains that may relate to the received utterance. The NLU storage 273 includes a database of domains 274 associated with specific devices. For example, the speech-detection device 110 may be associated with domains for music, telephony, calendaring, contact lists, and device-specific communications. In addition, the entity library 282 may include database entries about specific services on a specific device, either indexed by Device ID, User ID, Household ID, or some other indicator.

A domain may represent a discrete set of activities having a common theme, such as "shopping", "music", "calendaring", etc. As such, each domain may be associated with a particular language model and/or grammar database 276, a particular set of intents/actions 278, and/or a particular personalized lexicon 286. Each gazetteer 284 may include domain-indexed lexical information associated with a particular user and/or device. For example, the Gazetteer A 284a includes domain-index lexical information 286aa to 286an. A user's music-domain lexical information might include album titles, artist names, and song names, for example, whereas a user's contact-list lexical information might include the names of contacts. Since every user's music collection and contact list is presumably different, this personalized information improves entity resolution.

An utterance may be processed applying the rules, models, and information applicable to each identified domain. For example, if an utterance potentially implicates both communications and music, the utterance may be NLU processed using the grammar models and lexical information for communications, and may also be processed using the grammar models and lexical information for music. The responses to the spoken utterance produced by each set of models is scored, with the overall highest ranked result from all applied domains being ordinarily selected to be the correct result.

The IC component 264 parses the utterance to determine an intent(s) for each identified domain, where the intent(s) corresponds to the action to be performed that is responsive to the spoken utterance. Each domain is associated with a database 278 of words linked to intents. For example, a music intent database may link words and phrases such as "quiet," "volume off," and "mute" to a "mute" intent. The IC component 264 identifies potential intents for each identified domain by comparing words in the utterance to the words and phrases in the intents database 278.

In order to generate a particular interpreted response, the NER component 262 applies the grammar models and lexical information associated with the respective domain. Each grammar model 276 includes the names of entities (i.e., nouns) commonly found in speech about the particular domain (i.e., generic terms), whereas the lexical information 286 from the gazetteer 284 is personalized to the user and/or the device. For instance, a grammar model 276 associated with a shopping domain may include a database of words commonly used when people discuss shopping.

The intents identified by the IC component 264 are linked to domain-specific grammar frameworks (included in 276) with "slots" or "fields" to be filled. For example, if "play music" is an identified intent, a grammar framework(s) may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, the NER component 262 may parse the spoken utterance to identify words as subject, object, verb, preposition, etc., based on grammar rules and models, prior to recognizing named entities. The identified verb may be used by the IC component 264 to identify intent, which is then used by the NER component 262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER component 262 then searches the corresponding fields in the domain-specific and personalized lexicon(s), attempting to match words and phrases in the utterance tagged as a grammatical object or object modifier with those identified in the database(s).

This process includes semantic tagging, which is the labeling of a word or combination of words according to their type/semantic meaning. Parsing may be performed using heuristic grammar rules, or the NER component 262 may be constructed using techniques such as HMMs, maximum entropy models, log linear models, conditional random fields (CRF), and the like.

For instance, an utterance of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC component 264 will determine corresponds to the "play music" intent. No determination has been made as to the meaning of "mother's little helper" and "the rolling stones," but based on grammar rules and models, it is determined that these phrases relate to the grammatical object of the spoken utterance.

The frameworks linked to the intent are then used to determine what database fields should be searched to determine the meaning of these phrases, such as searching a user's gazetteer for similarity with the framework slots. So a framework for a "play music" intent might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the slot/field using gazetteer information, the NER component 262 may search the database of generic words associated with the domain (i.e., in the NLU storage 273). For instance, if the utterance was "play songs by the rolling stones," after failing to determine an album name or song name called "songs" by "the rolling stones," the NER component 262 may search the domain vocabulary for the word "songs." In the alternative, generic words may be checked before the gazetteer information, or both may be tried, potentially producing two different results.

The comparison process used by the NER component 262 may classify (i.e., score) how closely a database entry compares to a tagged word or phrase, how closely the grammatical structure of the utterance corresponds to the applied grammatical framework, and based on whether the database indicates a relationship between an entry and information identified to fill other slots of the framework.

The NER component 262 may also use contextual operational rules to fill slots. For example, if a user had previously requested to pause a particular song and thereafter requested that the speech-detection device 110 "please un-pause my music," the NER component 262 may apply an inference-based rule to fill a slot associated with the name of the song that the user currently wishes to play—namely the song that was playing at the time the user requested to pause the music.

The results of NLU processing may be tagged to attribute meaning to the utterance. For example, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output from the ASR component 250 may also be sent to a user recognition component 295 either directly or indirectly through the orchestrator component 297. Alternatively, the user recognition component 295 may be implemented as part of the ASR component 250. The user recognition component 295 performs user recognition using the audio data 111, and optionally the ASR component output. The user recognition component 295 may include a scoring component that determines respective scores indicating whether the input utterance in the audio data 111 was spoken by particular users. The user recognition component 2 may also include a confidence component that determines an overall confidence as the accuracy of user recognition operations. User recognition may involve comparing speech characteristics in the audio data 111 to stored speech characteristics of users. User recognition may also involve comparing biometric data (e.g., fingerprint data, iris data, etc.) received by the user recognition component 295 to stored biometric data of users. User recognition may further involve comparing image data including a representation of a feature of a user with stored image data including representations of features of users. It should be appreciated that other kinds of user recognition processes, including those known in the art, may be used.

Output from the NLU processing, which may include tagged text data, commands, etc., and output of the user recognition component 295 (e.g., a unique ID of a user) may be sent to a command processor 290, which may be located on a same or separate server 120 as part of the system 100. The system 100 may include more than one command processor 290, and the command processor(s) 290 may be determined based on the NLU output. For example, if the NLU output includes a command to play music, the command processor 290 selected may correspond to a music playing application, such as one located on the speech-detection device 110 or in a music playing appliance. Many such command processors 290 may be available to the system 100 depending on the various applications that may be invoked. If the NLU output includes a search utterance (e.g., requesting the return of search results), the command processor 290 selected may include a search engine processor, such as one located on a search server, configured to execute a search command and determine search results, which may include output text data to be processed by a TTS engine and output from a device as synthesized speech.

Output from the NLU component 260 (and optionally the user recognition component 295) may be sent to a command processor(s) 290/skill either directly or indirectly via the orchestrator component 297. A "skill" may correspond to a domain and may be software running on a server or device akin to an application. That is, a skill may enable a server(s) 120/125 to execute specific functionality in order to provide data or produce some other output called for by a user. The system may be configured with more than one skill. For example a weather service skill may enable the server(s) 120 to execute a command with respect to a weather service server 125, a car service skill may enable the server(s) 120 to execute a command with respect to a taxi service server 125, an order pizza skill may enable the server(s) 120 to execute a command with respect to a restaurant server 125, etc.

Figure 3:
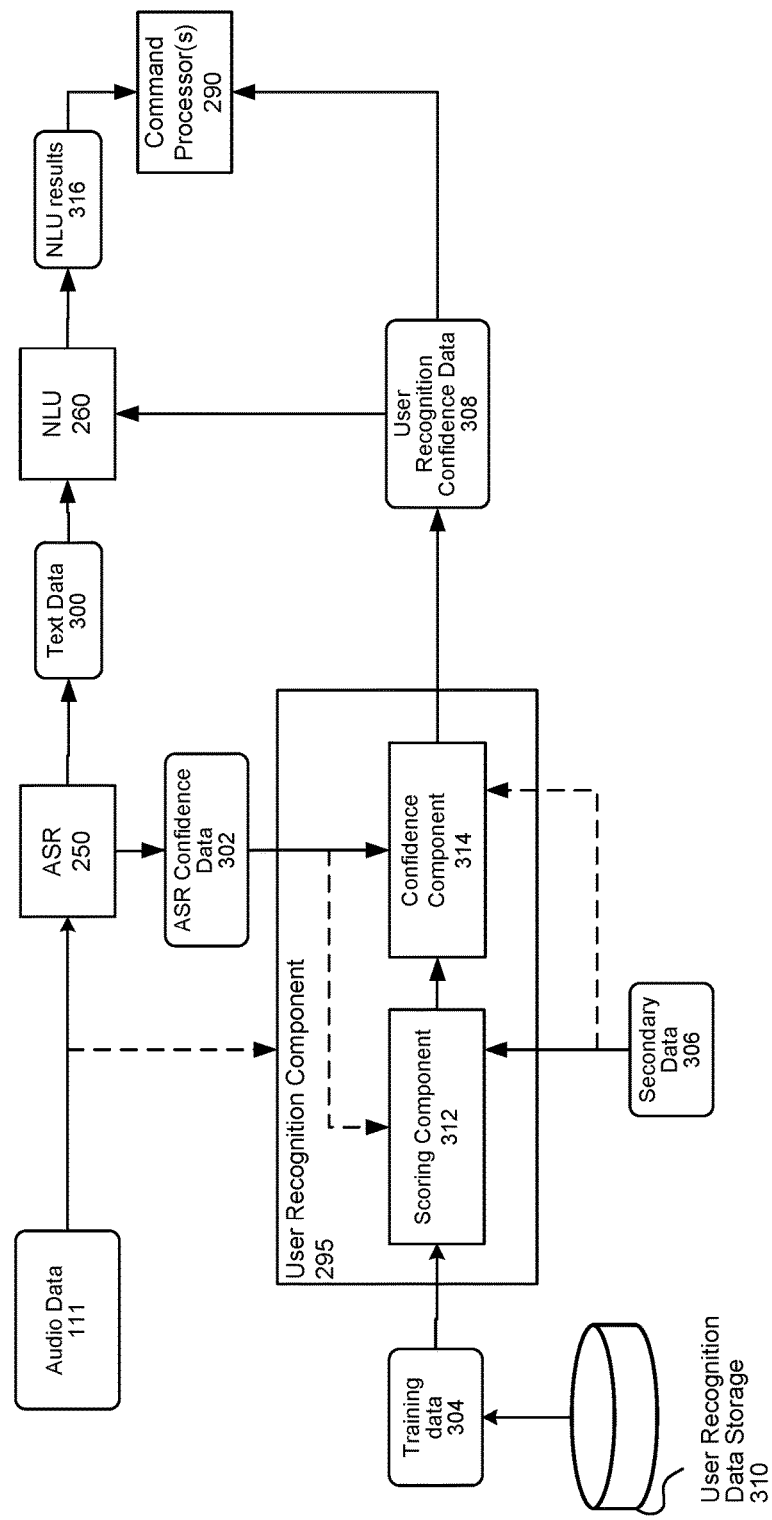
FIG. 3 is a system flow diagram illustrating user recognition according to embodiments of the present disclosure.

FIG. 3 illustrates user recognition as performed by the user recognition component 295. The ASR component 250 performs ASR on the audio data 111 as described above. ASR output (i.e., text data 300) is then processed by the NLU component 260 as described above.

The ASR component 250 may also output ASR confidence data 302, which is passed to the user recognition component 295. The user recognition component 295 performs user recognition using various data including the audio data 111, training data 304 corresponding to sample audio data corresponding to known users, the ASR confidence data 302, and secondary data 306. The user recognition component 295 may output user recognition confidence data 308 that reflects a certain confidence that the input utterance was spoken by one or more particular users. The user recognition confidence data 308 may include an indicator of a verified user (such as a user ID corresponding to the speaker of the utterance) along with a confidence value corresponding to the user ID, such as a numeric value or binned value as discussed below.

The training data 304 may be stored in a user recognition data storage 310. The user recognition data storage 310 may be stored by the server(s) 120, or may be a separate device. Further, the user recognition data storage 310 may be part of the user profile storage 502. The user recognition data storage 310 may be a cloud-based storage. The training data 304 stored in the user recognition data storage 310 may be stored as waveforms and/or corresponding features/vectors. The training data 310 may correspond to data from various audio samples, each audio sample associated with a known user and/or user identity. For example, each user known to the system may be associated with some set of training data 304 for the known user. The user recognition component 295 may then use the training data 304 to compare against incoming audio data 111 to determine the identity of a user speaking an utterance. The training data 304 stored in the user recognition data storage 310 may thus be associated with multiple users of multiple devices. Thus, the training data 304 stored in the storage 310 may be associated with both a user that spoke the respective utterance, as well as the speech-detection device 110 that captured the respective utterance.

To perform user recognition, the user recognition component 295 may determine the speech-detection device 110 from which the audio data 111 originated. For example, the audio data 111 may include a tag indicating the speech-detection device 110. Either the speech-detection device 110 or the server(s) 120 may tag the audio data 111 as such. The user recognition component 295 may send a signal to the user recognition data storage 310, with the signal requesting only training data 304 associated with known users of the speech-detection device 110 from which the audio data 111 originated. This may include accessing a user profile(s) associated with the speech-detection device 110 and then only inputting training data 304 associated with users corresponding to the user profile(s) of the device 110. This limits the universe of possible training data the user recognition component 295 should consider at runtime when recognizing a user and thus decreases the amount of time to perform user recognition by decreasing the amount of training data 304 needed to be processed. Alternatively, the user recognition component 295 may access all (or some other subset of) training data 304 available to the system. However, accessing all training data 304 will likely increase the amount of time needed to perform user recognition based on the magnitude of training data to be processed.

If the user recognition component 295 receives training data 304 as an audio waveform, the user recognition component 295 may determine features/vectors of the waveform(s) or otherwise convert the waveform into a data format that can be used by the user recognition component 295 to actually perform the user recognition. The user recognition component 295 may then identify the user that spoke the utterance in the audio data 111 by comparing features/vectors of the audio data 111 to training features/vectors (either received from the storage 310 or determined from training data 304 received from the storage 310).

The user recognition component 295 may include a scoring component 312 which determines respective scores indicating whether the input utterance (represented by audio data 111) was spoken by particular users (represented by training data 304). The user recognition component 295 may also include a confidence component 314 which determines an overall confidence as the accuracy of the user recognition operations (such as those of the scoring component 312) and/or an individual confidence for each user potentially identified by the scoring component 312. The output from the scoring component 312 may include scores for all users with respect to which user recognition was performed (e.g., all users associated with the speech-detection device 110). For example, the output may include a first score for a first user, a second score for a second user, and third score for a third user, etc. Although illustrated as two separate components, the scoring component 312 and confidence component 314 may be combined into a single component or may be separated into more than two components.

The scoring component 312 and confidence component 314 may implement one or more trained machine learning models (such neural networks, classifiers, etc.) as known in the art. For example, the scoring component 312 may use probabilistic linear discriminant analysis (PLDA) techniques. PLDA scoring determines how likely it is that an input audio data feature vector corresponds to a particular training data feature vector for a particular user. The PLDA scoring may generate similarity scores for each training feature vector considered and may output the list of scores and users and/or the user ID of the speaker whose training data feature vector most closely corresponds to the input audio data feature vector. The scoring component 312 may also use other techniques such as GMMs, generative Bayesian models, or the like, to determine similarity scores.

The confidence component 314 may input various data including information about the ASR confidence 302, utterance length (e.g., number of frames or time of the utterance), audio condition/quality data (such as signal-to-interference data or other metric data), fingerprint data, image data, or other factors to consider how confident the user recognition component 295 is with regard to the scores linking users to the input utterance. The confidence component 314 may also consider the similarity scores and user IDs output by the scoring component 312. Thus, the confidence component 314 may determine that a lower ASR confidence represented in the ASR confidence data 302, or poor input audio quality, or other factors, may result in a lower confidence of the user recognition component 295. Whereas a higher ASR confidence represented in the ASR confidence data 302, or better input audio quality, or other factors, may result in a higher confidence of the user recognition component 295. Precise determination of the confidence may depend on configuration and training of the confidence component 314 and the models used therein. The confidence component 314 may operate using a number of different machine learning models/techniques such as GMM, neural networks, etc. For example, the confidence component 314 may be a classifier configured to map a score output by the scoring component 312 to a confidence.

The user recognition component 295 may output user recognition confidence data 308 specific to a single user, or multiple users in the form of an N-best list. For example, the user recognition component 295 may output user recognition confidence data 308 with respect to each user indicated in the profile associated with the speech-detection device 110 from which the audio data 111 was received. The user recognition confidence data 308 may include particular scores (e.g., 0.0-1.0, 0-1000, or whatever scale the system is configured to operate). Thus the system may output an N-best list of potential users with confidence scores (e.g., John—0.2, Jane—0.8). Alternatively or in addition, the user recognition confidence data 308 may include binned recognition indicators. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." Thus, the system may output an N-best list of potential users with binned scores (e.g., John—low, Jane—high). Combined binned and confidence score outputs are also possible. Rather than a list of users and their respective scores and/or bins, the user recognition confidence data 308 may only include information related to the top scoring user as determined by the user recognition component 295. The scores and bins may be based on information determined by the confidence component 314. The user recognition component 295 may also output a confidence value that the scores/bins are correct, where the confidence value indicates how confident the user recognition component 295 is in the output results. This confidence value may be determined by the confidence component 314.

The confidence component 314 may determine individual user confidences and differences between user confidences when determining the user recognition confidence data 308. For example, if a difference between a first user's confidence score and a second user's confidence score is large, and the first user's confidence score is above a threshold, then the user recognition component 295 is able to recognize the first user as the user that spoke the utterance with a much higher confidence than if the difference between the users' confidences were smaller.

The user recognition component 295 may perform certain thresholding to avoid incorrect user recognition results being output. For example, the user recognition component 295 may compare a confidence score output by the confidence component 314 to a confidence threshold. If the confidence score is not above the confidence threshold (for example, a confidence of "medium" or higher), the user recognition component 295 may not output user recognition confidence data 308, or may only include in that data 308 an indication that a user speaking the utterance could not be verified. Further, the user recognition component 295 may not output user recognition confidence data 308 until enough input audio data 111 is accumulated and processed to verify the user above a threshold confidence. Thus, the user recognition component 295 may wait until a sufficient threshold quantity of audio data of the utterance has been processed before outputting user recognition confidence data 308. The quantity of received audio data may also be considered by the confidence component 314.

The user recognition component 295 may be defaulted to output binned (e.g., low, medium, high) user recognition confidence data 308. However, such may be problematic from the command processor(s) 290 perspective. For example, if the user recognition component 295 computes a single binned confidence for multiple users, the command processor(s) 290 may not be able to determine which user to determine content with respect to. In this situation, the user recognition component 295 may be configured to override its default setting and output user recognition confidence data 308 including values (e.g., 0.0-1.0) associated with the users associated with the same binned confidence. This enables the command processor(s) 290 to select content associated with the user associated with the highest confidence value. The user recognition confidence data 308 may also include the user IDs corresponding to the potential user(s) who spoke the utterance.

In addition, the user recognition component 295 may use secondary data 306 to inform user recognition processing. Thus, a trained model or other component of the user recognition component 295 may be trained to take secondary data 306 as an input feature when performing recognition. Secondary data 306 may include a wide variety of data types depending on system configuration and may be made available from other sensors, devices, or storage such as user profile data 504, etc. The second data 306 may include a time of day at which the audio data was captured, a day of a week in which the audio data was captured, the text data 300, and/or NLU results 316.

In one example, secondary data 306 may include image data or video data. For example, facial recognition may be performed on image data or video data received from the speech-detection device 110 from which the audio data 111 was received. Facial recognition may be performed by the user recognition component 295, or another component of the server(s) 120. The output of the facial recognition process may be used by the user recognition component 295. That is, facial recognition output data may be used in conjunction with the comparison of the features/vectors of the audio data 111 and training data 304 to perform more accurate user recognition.

The secondary data 306 may also include location data of the speech-detection device 110. The location data may be specific to a building within which the speech-detection device 110 is located. For example, if the speech-detection device 110 is located in user A's bedroom, such location may increase user recognition confidence data associated with user A, but decrease user recognition confidence data associated with user B.

The secondary data 306 may further include type data indicating a type of the speech-detection device 110. Different types of speech-detection devices may include, for example, a smart watch, a smart phone, a tablet computer, and a vehicle. The type of speech-detection device 110 may be indicated in a profile associated with the speech-detection device 110. For example, if the speech-detection device 110 from which the audio data 111 was received is a smart watch or vehicle belonging to user A, the fact that the speech-detection device 110 belongs to user A may increase user recognition confidence data associated with user A, but decrease user recognition confidence data associated with user B.

The secondary data 306 may additionally include geographic coordinate data associated with the speech-detection device 110. For example, a profile associated with a vehicle may indicate multiple users (e.g., user A and user B). The vehicle may include a global positioning system (GPS) indicating latitude and longitude coordinates of the vehicle when the audio data 111 is captured by the vehicle. As such, if the vehicle is located at a coordinate corresponding to a work location/building of user A, such may increase user recognition confidence data associated with user A, but decrease user recognition confidence data of all other users indicated in the profile associated with the vehicle. Global coordinates and associated locations (e.g., work, home, etc.) may be indicated in a user profile associated with the speech-detection device 110. The global coordinates and associated locations may be associated with respective users in the user profile.

The secondary data 306 may also include other data/signals about activity of a particular user that may be useful in performing user recognition of an input utterance. For example, if a user has recently entered a code to disable a home security alarm, and the utterance corresponds to a device at the home, signals from the home security alarm about the disabling user, time of disabling, etc. may be reflected in the secondary data 306 and considered by the user recognition component 295. If a mobile device (such as a phone, Tile, dongle, or other device) known to be associated with a particular user is detected proximate to (for example physically close to, connected to the same WiFi network as, or otherwise nearby) the speech-detection device 110, this may be reflected in the secondary data 306 and considered by the user recognition component 295.

As shown in FIG. 3, the ASR component 250 may output text data 300, which in turn is processed by the NLU component 260. The results 316 of NLU processing performed by the NLU component 260 and the user recognition confidence data 308 output by the user recognition component 295 may be sent to one or more applications, represented by command processor(s) 290. The command processor(s) 290 that receives the NLU results 316 and the user recognition confidence score data 308 may be determined by the server(s) 120 as corresponding to content responsive to the utterance in the audio data 111. For example, if the audio data 111 includes the utterance "Play my music," the NLU results 316 and user recognition confidence data 308 may be sent to a music playing command processor 290.

Various machine learning techniques may be used to train and operate models to perform various steps described above, such as user recognition scoring, user recognition confidence determination, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 4:
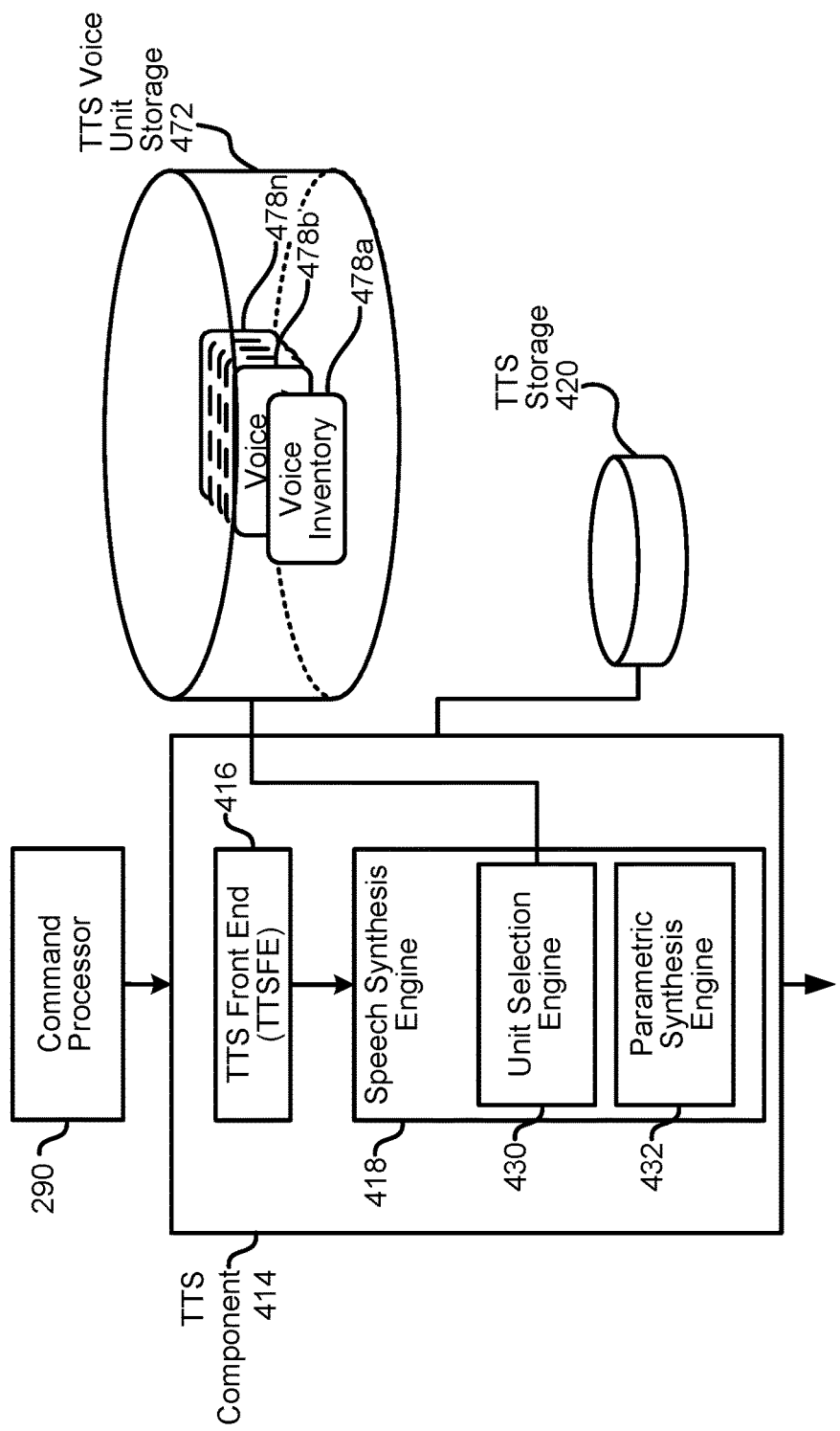
FIG. 4 is a diagram of components of a TTS component according to embodiments of the present disclosure.

To convert text data into output audio data including speech, the system 100 may use a TTS component 414, as illustrated in FIG. 4. The TTS component 414 may receive text data (from the command processor 290, application server(s) 125, or other component) so the TTS component 414 may synthesize speech corresponding to the text data. Speech may be synthesized by the TTS component 414 as described below with respect to FIG. 4.

The TTS component 414 includes a TTS front end (TTSFE) 416, a speech synthesis engine 418, and a TTS storage 420. The TTSFE 416 transforms input text data (e.g., from the command processor 290) into a symbolic linguistic representation for processing by the speech synthesis engine 418. The TTSFE 416 may also process tags or other data input to the TTS component 414 that indicate how specific words should be pronounced. The speech synthesis engine 418 compares the annotated phonetic units and information stored in the TTS storage 420 for converting the input text data into speech (i.e., audio data). The TTSFE 416 and the speech synthesis engine 418 may include their own controller(s)/processor(s) and memory, or they may use the controller/processor and memory of the server(s) 120, the speech-detection device 110, or another device, for example. Similarly, the instructions for operating the TTSFE 416 and the speech synthesis engine 418 may be located within the TTS component 414, within the memory and/or storage of the server(s) 120, the speech-detection device 110, or within an external device.

Text data input into the TTS component 414 may be sent to the TTSFE 416 for processing. The TTSFE 416 may include modules for performing text normalization, linguistic analysis, and linguistic prosody generation. During text normalization, the TTSFE 416 processes the input text data and generates standard/normalized text data, converting such things as numbers, abbreviations (e.g., Apt., St., etc.), and symbols ($, %, etc.) into the equivalent of written out words.

During linguistic analysis the TTSFE 416 analyzes language in the normalized text data to generate a sequence of phonetic units corresponding to the text data. This process may be referred to as phonetic transcription. Phonetic units include symbolic representations of sound units to be eventually combined and output by the system 100 as speech. Various sound units may be used for dividing text data for purposes of speech synthesis. The TTS component 414 may process speech based on phonemes (i.e., individual sounds), half-phonemes, di-phones (i.e., the last half of one phoneme coupled with the first half of an adjacent phoneme), bi-phones (i.e., two consecutive phonemes), syllables, words, phrases, sentences, or other units. Each word may be mapped to one or more phonetic units. Such mapping may be performed using a language dictionary stored by the system 100, for example in the TTS storage 420. The linguistic analysis performed by the TTSFE 416 may also identify different grammatical components such as prefixes, suffixes, phrases, punctuation, syntactic boundaries, or the like. Such grammatical components may be used by the TTS component 414 to craft a natural sounding audio waveform output. The language dictionary may also include letter-to-sound rules and other tools that may be used to pronounce previously unidentified words or letter combinations that may be encountered by the TTS component 414. Generally, the more information included in the language dictionary, the higher quality the speech output.

Based on the linguistic analysis, the TTSFE 416 may then perform linguistic prosody generation where the phonetic units are annotated with desired prosodic characteristics, also called acoustic features, which indicate how the desired phonetic units are to be pronounced in the eventual output speech. During this stage, the TTSFE 416 may consider and incorporate any prosodic annotations that accompanied the text data input to the TTS component 414. Such acoustic features may include pitch, energy, duration, and the like. Application of acoustic features may be based on prosodic models available to the TTS component 414. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, a prosodic model with more information may result in higher quality speech output than prosodic models with less information.

The output of the TTSFE 416, referred to as a symbolic linguistic representation, may include a sequence of phonetic units annotated with prosodic characteristics. This symbolic linguistic representation may be sent to the speech synthesis engine 418, also known as a synthesizer, for conversion into an audio waveform of speech for output to an audio output device and eventually to a user. The speech synthesis engine 418 may be configured to convert the input text data into high-quality natural-sounding speech in an efficient manner. Such high-quality speech may be configured to sound as much like a human speaker as possible, or may be configured to be understandable to a listener without attempts to mimic a precise human voice.

The speech synthesis engine 418 may perform speech synthesis using one or more different methods. In one method of synthesis called unit selection, a unit selection engine 430 matches the symbolic linguistic representation created by the TTSFE 416 against a database of recorded speech, such as a database of a voice corpus. The unit selection engine 430 matches the symbolic linguistic representation against spoken audio units in the database. Matching units are selected and concatenated together to form a speech output. Each unit includes an audio waveform corresponding with a phonetic unit, such as a short .wav file of the specific sound, along with a description of the various acoustic features associated with the .wav file (e.g., its pitch, energy, etc.), as well as other information, such as where the phonetic unit appears in a word, sentence, or phrase, neighboring phonetic units, etc. Using all the information in the unit database, the unit selection engine 430 may match units to the input text data to create a natural sounding waveform. The unit database may include multiple examples of phonetic units to provide the system 100 with many different options for concatenating units into speech. One benefit of unit selection is that, depending on the size of the database, a natural sounding speech output may be generated. As described above, the larger the unit database of the voice corpus, the more likely the system 100 will be able to construct natural sounding speech.

In another method of synthesis called parametric synthesis, parameters such as frequency, volume, and noise are varied by a parametric synthesis engine 432, a digital signal processor, or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Parametric synthesis may include the ability to be accurate at high processing speeds, as well as the ability to process speech without large databases associated with unit selection, but also typically produces an output speech quality that may not match that of unit selection. Unit selection and parametric techniques may be performed individually or combined together and/or combined with other synthesis techniques to produce speech audio data output.

Parametric speech synthesis may be performed as follows. The TTS component 414 may include an acoustic model, or other models, which may convert a symbolic linguistic representation into a synthetic acoustic waveform of the input text data based on audio signal manipulation. The acoustic model includes rules which may be used by the parametric synthesis engine 432 to assign specific audio waveform parameters to input phonetic units and/or prosodic annotations. The rules may be used to calculate a score representing a likelihood that a particular audio output parameter(s) (e.g., frequency, volume, etc.) corresponds to the portion of the input symbolic linguistic representation received from the TTSFE 416.

The parametric synthesis engine 432 may use a number of techniques to match speech to be synthesized with input phonetic units and/or prosodic annotations. One common technique is using HMMs. HMMs may be used to determine probabilities that audio output should match textual input. HMMs may be used to translate from parameters from the linguistic and acoustic space to parameters to be used by a vocoder (i.e., a digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text data. Each portion of text data may be represented by multiple potential states corresponding to different known pronunciations of phonemes and their parts (e.g., phoneme identity, stress, accent, position, etc.). An initial determination of a probability of a potential phoneme may be associated with one state. As new text data is processed by the speech synthesis engine 418, the state may change or stay the same, based on processing of the new text data. For example, the pronunciation of a previously processed word might change based on later processed words. A Viterbi algorithm may be used to find the most likely sequence of states based on the processed text data. The HMMs may generate speech in parametrized form including parameters such as fundamental frequency (f0), noise envelope, spectral envelope, etc. that are translated by a vocoder into audio segments. The output parameters may be configured for particular vocoders such as STRAIGHT vocoders, TANDEM-STRAIGHT vocoders, harmonic plus noise (HNM) based vocoders, code-excited linear prediction (CELP) vocoders, GlottHMM vocoders, harmonic/stochastic model (HSM) vocoders, or others.

For example, to create the customized speech output of the system 100, the system 100 may be configured with multiple voice inventories 478 (stored in TTS voice unit storage 472), where each unit database is configured with a different "voice." Such voice inventories may also be linked to user accounts. For example, one voice corpus may be stored to be used to synthesize whispered speech (or speech approximating whispered speech), another may be stored to be used to synthesize excited speech (or speech approximating excited speech), and so on. To create the different voice corpuses, a multitude of TTS training utterances may be spoken by an individual and recorded by the system 100. The TTS training utterances used to train a TTS voice corpus may be different from the training utterances used to train an ASR system. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus, the audio of each customized voice corpus may match a desired speech quality. The customized voice inventory 478 may then be used during runtime to perform unit selection to synthesize speech.

As an alternative to customized voice corpuses or customized parametric "voices," one or more filters may be used to alter traditional TTS output to match a desired speech quality (e.g., whisper, shout, etc.). For example, the TTS component 414 may synthesize speech as normal, but the system 100, either as part of the TTS component 414 or otherwise, may apply a filter to make the synthesized speech take on the desired speech quality. In this manner, a traditional TTS output may be altered to take on the desired speech quality.

During runtime, the TTS component 414 may receive text data for speech synthesis along with an indicator for a desired speech quality of the output speech. The TTS component 414 may then select a voice matching the speech quality, either for unit selection or parametric synthesis, and synthesize speech using the received text data and speech quality indicator.

Figure 5:
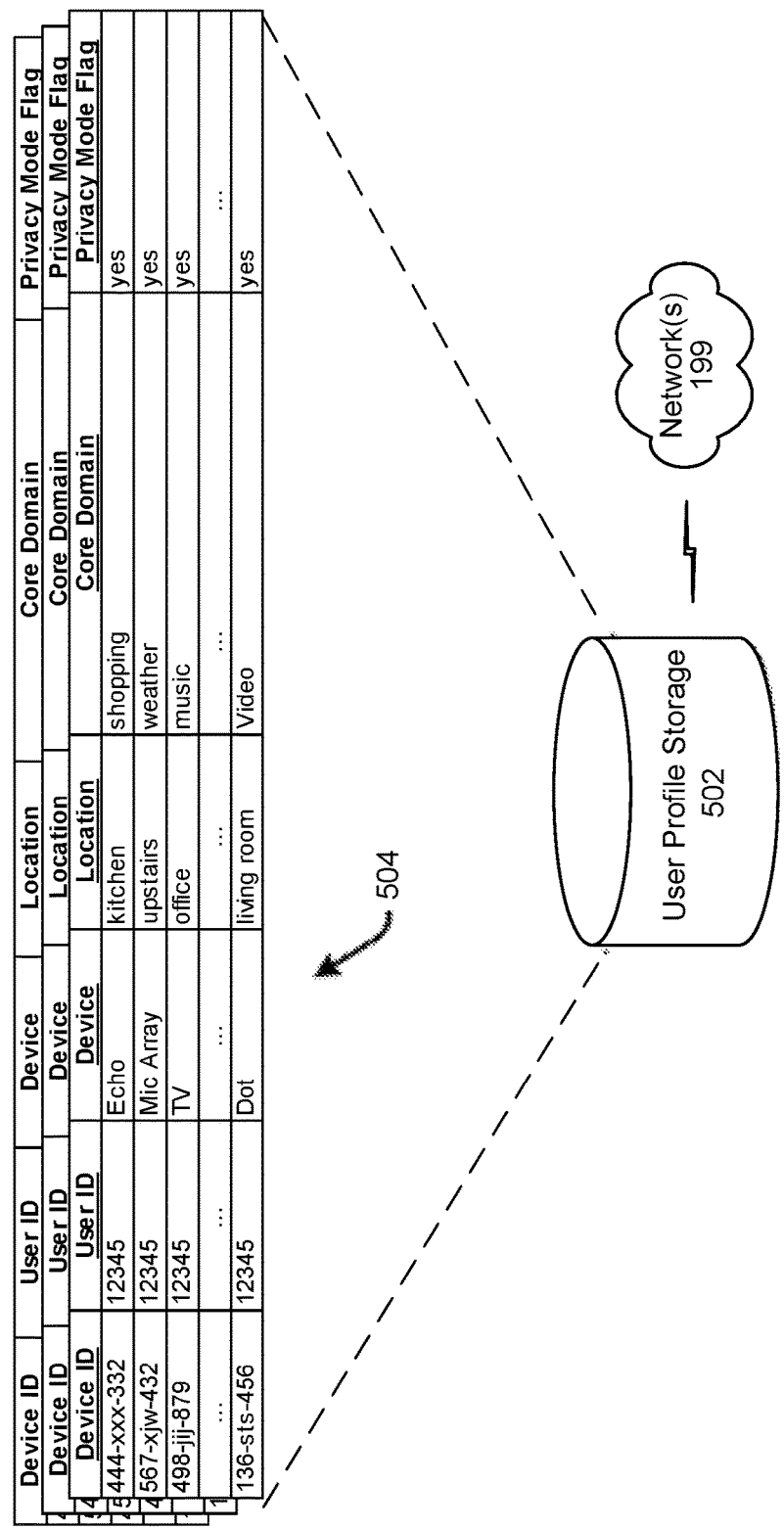
FIG. 5 illustrates data stored and associated with user profiles according to embodiments of the present disclosure.

FIG. 5 illustrates a user profile storage 502 that includes data regarding user accounts 504 as described herein. The user profile storage 502 may be located proximate to the server(s) 120, or may otherwise be in communication with various components, for example over the network(s) 199. The user profile storage 502 may include a variety of information related to individual users, accounts, etc. that interact with the system 100. For illustration, as shown in FIG. 5, the user profile storage 502 may include data regarding the devices associated with particular individual user accounts 504. In an example, the user profile storage 502 is a cloud-based storage. Each user profile 504 may include data such as device identifier (ID) data, user identifier (ID) data, name of device data, and location of device data.

In addition, each user profile 504 may include a bit or other data (i.e., privacy mode flag data) indicating the privacy mode is activated with respect to a user ID associated with the user profile. A positive bit value (or other bit value) may indicate the privacy mode is activated with respect to the particular user ID. The privacy mode flag data may indicate the user ID is associated with the privacy mode flag (i.e., may indicate that all user utterances spoken by a user associated with the user ID should be processed using the privacy mode(s) described herein). If the privacy mode flag data is simply associated with the user's unique ID, as compared to the following embodiments, the server(s) 120 may process utterances of the user using a privacy mode, regardless of the speech-detection device 110 that received the utterance from the user. For example, a user may activate privacy mode at a first speech-detection device, and may speak an utterance to the first speech-detection device, which will be processed using privacy mode. The user may thereafter speak an utterance to a second speech-detection device. If the user did not deactivate the privacy mode prior to speaking the utterance to the second speech-detection device, the server(s) 120 will process such utterance using privacy mode.

The privacy mode flag data of a user profile 504 may also be tied to specific device data indicated in the user profile 504. A user may activate privacy mode with respect to utterances detected by a specific user device, but may not activate privacy mode with respect to utterances detected by other user devices. For example, a privacy mode flag may be associated with a speech-detection device 110 located in the user's bedroom, but may not be associated with a speech-detection device 110 located in the user's kitchen.

The privacy mode flag data of a user profile 504 may additionally be tied to core domain data indicated in the user profile 504. A user may enable spoken utterances to be processed with respect to specific core domains such as shopping, weather, music, video, etc. A core domain may correspond to a type of content the system is able to output to a user. A user may activate privacy mode with respect utterances processed using a given core domain, but may not activate privacy mode with respect to utterances processed using other core domains. For example, a privacy mode flag may be associated with processing by a music core domain, but not associated with processing by a weather core domain. The core domain with which the privacy mode flag is associated may correspond to the core domain triggered by the user utterance used to activate the privacy mode. For example, if the user says "privately, play me an Adele song," the system may associate a privacy mode flag with a music core domain. This would result in the system processing user utterances with respect to the music domain using the privacy mode, while processing utterances that do not invoke the music domain using a non-privacy mode.

The privacy mode discussed herein may invoke various non-traditional processing functions in order to maintain user browsing anonymity. Under normal processing, the system may send a user's unique ID to an application server(s) 125 to obtain content responsive to a command. When privacy mode is activated, however, the system may send a user group ID to an application server(s) 125 (as discussed with respect to FIG. 10) below, or may send no data or null or other data in place of a user ID, such that the individual ID of the requesting user is not passed to the application server 125 in privacy mode. Further, under normal processing, the system may save data with respect to processing of a user commands in order to train components of the system to obtain customized results for the user in the future. In contrast, when privacy mode is activated, the system may temporarily save data needed to perform speech processing and the like, but may delete the data after processing with respect thereto is complete, thereby eliminating a record of the user's interaction with the system when privacy mode is activated.

FIG. 6A illustrates the activation of, processing with respect to, privacy mode associated with a user's unique ID. FIG. 6B illustrates the deactivation of privacy mode associated with the user's unique ID. The speech-detection device 110 receives (602) input audio corresponding to an utterance, and sends (604) input audio data corresponding thereto to the server(s) 120 for processing.

The server(s) 120, upon receiving the input audio data, performs speech processing on the input audio data. Namely, the server(s) 120 may perform (606) ASR on the input audio data to generate text data, and may perform (608) NLU on the text data.

The server(s) 120 may determine (610), based on the NLU processing, the utterance includes an indication to activate a privacy mode. In one example, the indication may be speech corresponding to a user command to activate a privacy mode. Such user command may be, for example, "enter privacy mode," "enter privacy mode for me," "activate enter privacy mode," or the like. In another example, the indication may be speech corresponding to a trigger word. Such speech including the trigger word may correspond to, for example, "privately, tell me a joke," "tell me a joke privately," or the like, with "privately" being the trigger word.

The server(s) 120 may identify (612) a user that spoke the utterance. Such determination may involve comparing speech characteristics in the input audio data to stored speech characteristics of users of the speech processing system 100, comparing biometric data (e.g., fingerprint data, iris data, etc.) of a user to stored biometric data of users of the speech processing system 100, and/or comparing image data including a representation of a feature of a user with stored image data including representations of features of users of the speech processing system 100. Other kinds of user recognition processes, including those known in the art, may also be used.

The server(s) 120 may determine (614) a unique ID associated with the user, may generate (616) a privacy mode flag based on determining the indication, and may associate (618) the privacy mode flag with the unique ID. Once the privacy mode flag is associated with the user's unique ID, the speech processing system 100 (e.g., the server(s) 120) will perform (620) speech processing and user command execution using a privacy mode for utterances spoken by the user associated with the unique ID.

At some point in time after the privacy mode flag is associated with the user's unique ID, the speech-detection device 110 may receive (622 illustrated in FIG. 6B) input audio corresponding to an utterance, and send (624) input audio data corresponding thereto to the server(s) 120 for processing.

The server(s) 120, upon receiving the input audio data, performs speech processing on the input audio data. Namely, the server(s) 120 may perform (626) ASR on the input audio data to generate text data, and may perform (628) NLU on the text data.

The server(s) 120 may determine (630), based on the NLU processing, the utterance spoken after the privacy mode flag was associated with the user's unique ID includes an indication to deactivate the privacy mode. In one example, the indication may be speech corresponding to a user command to deactivate the privacy mode. Such user command may be, for example, "exit privacy mode," "exit privacy mode for me," "deactivate privacy mode," or the like. In another example, the indication may be speech corresponding to a trigger word. Such speech including the trigger word may correspond to, for example, "publicly, tell me a joke," "tell me a joke publicly," or the like, with "publicly" being the trigger word.

The server(s) 120 may identify (632) a user that spoke the utterance using the various user recognition processes described herein. The server(s) 120 may also determine (634) a unique ID associated with the user, and may disassociate (636) the privacy mode flag with the unique ID. Once the privacy mode flag is unassociated with the user's unique ID, the speech processing system 100 (e.g., the server(s) 120) will perform (638) speech processing and user command execution in a non-privacy mode for utterances spoken by the user associated with the unique ID.

Figure 7A:
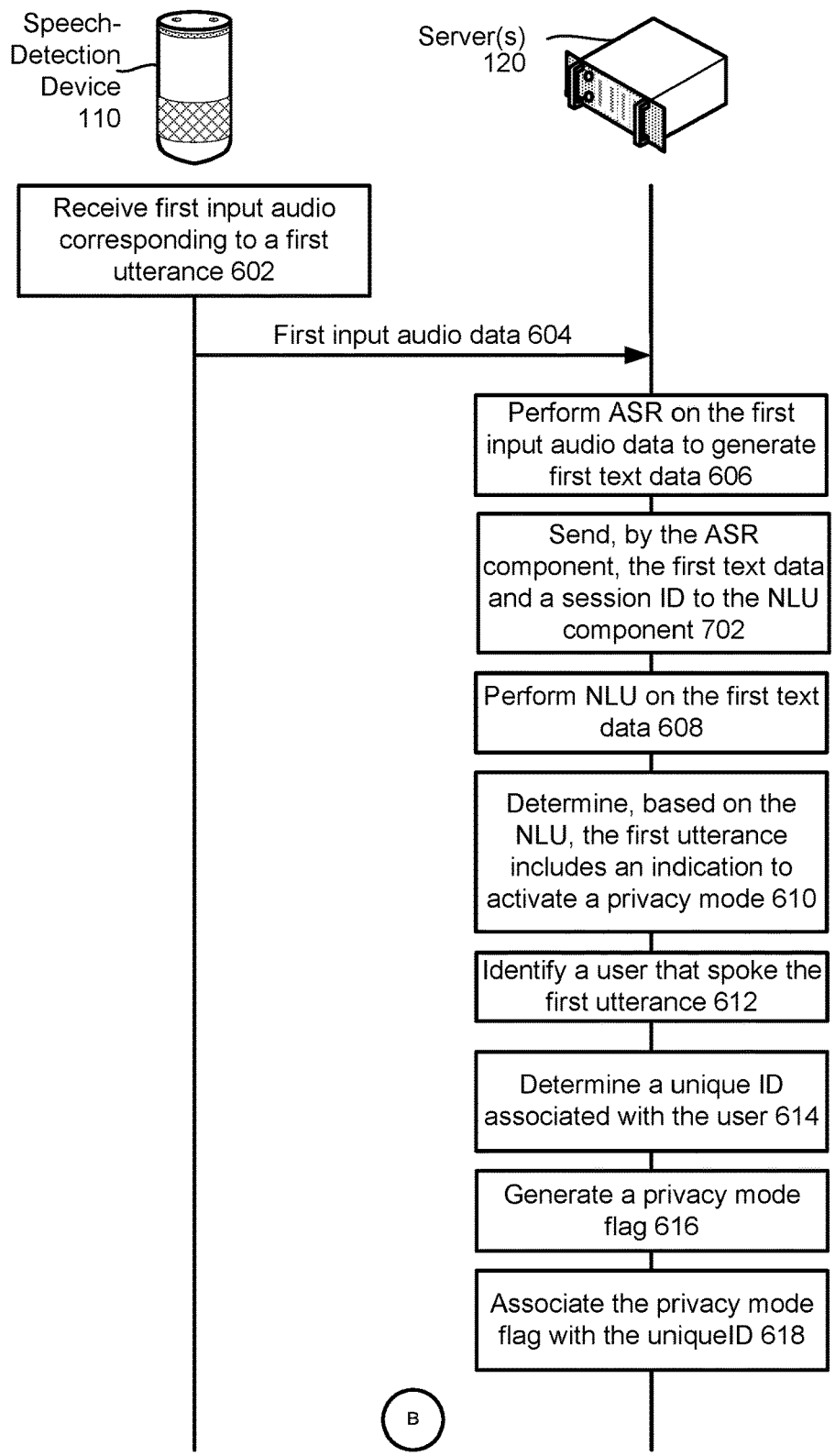

FIGS. 7A and 7B illustrate processing of an utterance (e.g., "enter privacy mode," "tell me privately what the weather is," etc.) using privacy mode in which the NLU component 260 commences a stream of data deletions. That is, the NLU component 260 causes various components of the system to delete data contemporaneously or substantially contemporaneously with the respective component performing its speech processing functions.

A speech-detection device 110 receives (602) input audio corresponding to an utterance, and sends (604) audio data corresponding thereto to the server(s) 120 for processing.

The server(s) 120 performs (606) ASR on the input audio data to generate text data. The ASR component 250 sends (702) the text data and a session ID to the NLU component 260. The session ID is an identifier generated by the server(s) 120, and used to keep track of processing with respect to a specific utterance. Thus, each time the server(s) 120 processes a new utterance, a unique session ID is created for the respective new utterance.

The server(s) 120 performs (608) NLU on the text data and determines (610), based on the NLU processing, the utterance includes an indication to activate a privacy mode. The indication may be a stand-alone user command or a trigger within a user command as described herein.

The server(s) 120 identifies (612) a user that spoke the utterance using user recognition processes as described herein. The server(s) 120 also determines (614) a unique ID associated with the user, generates (616) a privacy mode flag based on the determination of the indication to activate the privacy mode, and associates (618) the privacy mode flag with the unique ID of the user that spoke the utterance.

The NLU component 260 sends (704 illustrated in FIG. 7B) the session ID and the privacy mode flag to the ASR component 250. Alternatively, the NLU component 260 may send the session ID and the privacy mode flag to an orchestrator component 297 of the system. The orchestrator component 297 may send the session ID and the privacy mode flag to the ASR component 250. The privacy mode flag indicates to the ASR component 250 that the ASR component 250 should delete data associated with the session ID. The ASR component 250, upon receiving the session ID and the privacy mode flag, deletes (706) data associated with the session ID. Such deletion may involve the ASR component 250 deleting data from a storage accessible only to the ASR component 250, such as an ASR buffer, for example. Alternatively, the orchestrator component 297, upon receiving the session ID and the privacy mode flag, may delete data from an ASR storage or user profile storage storing speech processing data associated with the session ID.

The NLU component 260 also determines (708) NLU results based on the text data generated by and received from the ASR component 250. The NLU results may correspond to a user request for content. The NLU component 260 sends (710) the NLU results, the session ID, the user's unique ID, and the privacy mode flag to a command processor 290. If the NLU component 260 sends the session ID and the privacy mode flag to the orchestrator component 297, the NLU component 260 need not send the privacy mode flag to the command processor(s) 290 because the orchestrator component 297 could be configured to delete speech processing data generated by the command processor(s) 290 and associated with the session ID. Rather than send the user's unique ID to the command processor 290, a user group ID may be generated (by the NLU component 260 or another component of the server(s) 120) based on the user ID as described with respect to FIG. 10, and the NLU component 260 (or other component) may send the user group ID, and not the user ID, to the command processor 290. In another example, the NLU component 260 may not send the command processor 290 the user ID or a user group ID. For example, the NLU component 260 may perform entity resolution with respect to a portion of the text data to determine the exact content requested by the user, and the NLU component 260 may send an indication of the exact content to the command processor 290 without sending a user ID or a user group ID. For example, if the user says "play my playlist," the NLU component 260 can resolve "my playlist" to an indicator unique to the user's playlist, and may send the indicator to the command processor 290. The NLU component 260 also deletes (712) data associated with the session ID. Such deletion may occur simultaneously or substantially simultaneously with the NLU component 260 sending the NLU results to the command processor 290. Moreover, such deletion may involve the NLU component 260 deleting data from a storage accessible only to the NLU component 260, such as a NLU buffer, for example.

The command processor 290 receives (714) content responsive to the NLU results. The command processor 290 may receive the content form a 1P or 3P application as disclosed herein. The command processor 290 sends (716) the content to the speech-detection device 110 (or another device indicated in a profile of the user associated with the unique ID). The speech-detection device 110 (or the other device) then outputs (718) the content. The command processor 290 also deletes (720) data associated with the session ID. Such deletion may occur simultaneously or substantially simultaneously with the command processor 290 sending the content to the speech-detection device 110 (or other device). Such deletion may also occur simultaneously or substantially simultaneously with the speech-detection device 110 (or other device) outputting the content. Moreover, such deletion may involve the command processor 290 deleting data from a storage accessible only to the command processor 290, such as a command processor buffer, for example. Alternatively, the orchestrator component 297 may delete the data from storage associated with the command processor 290.

Figure 8A:
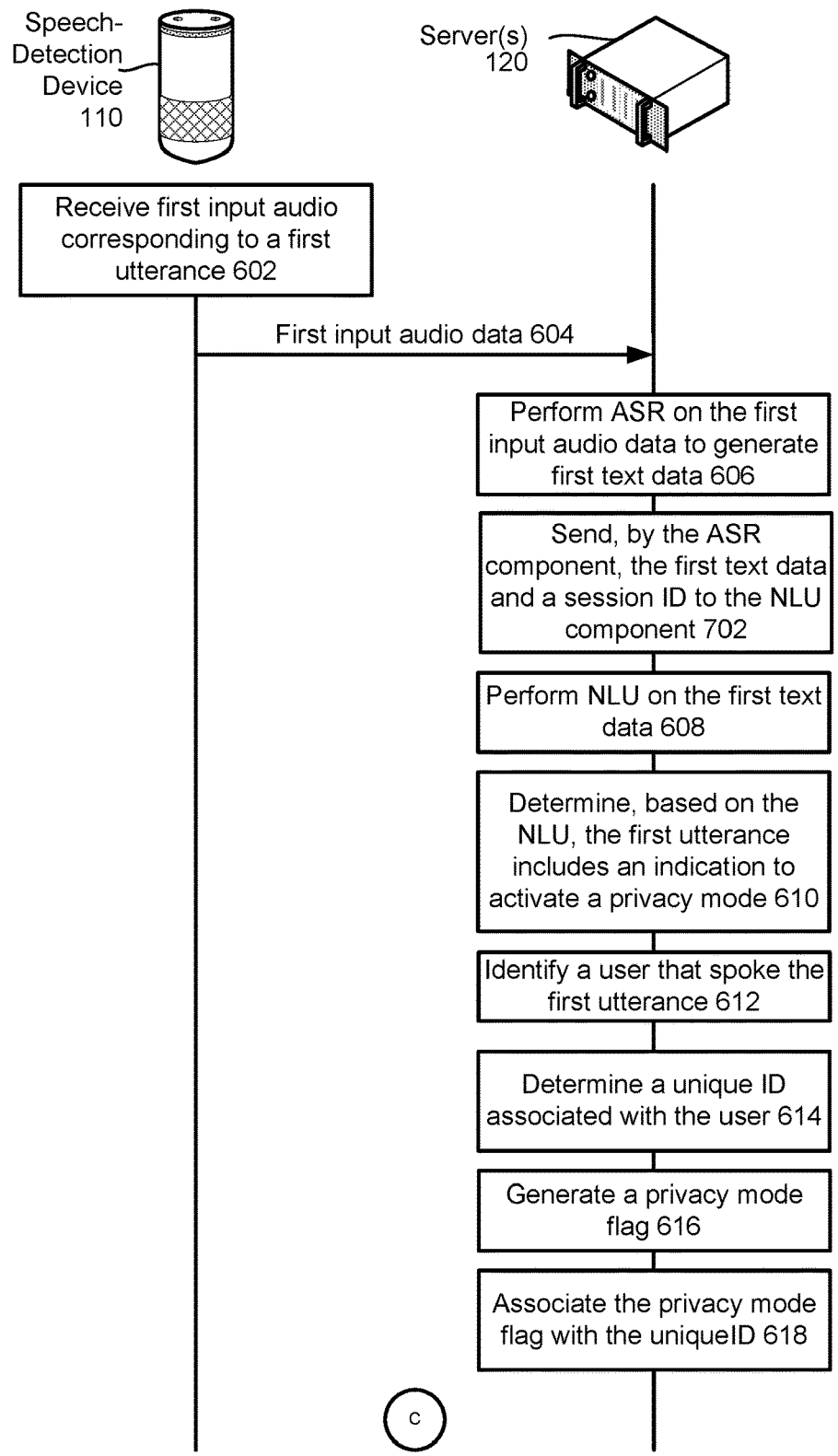

FIGS. 8A and 8B illustrate processing of an utterance using privacy mode in which the command processor 290 (or another component of the system 100) commences a stream of data deletions. That is, after the system completely finishes processing the user utterance, the command processor 290 (or other component of the system 100) sends the privacy mode flag to various components of the system 100, causing the various components to delete data associated with processing of the user utterance.

A speech-detection device 110 receives (602) input audio corresponding to an utterance, and sends (604) audio data corresponding thereto to the server(s) 120 for processing.

The server(s) 120 performs (606) ASR on the input audio data to generate text data. The ASR component 250 sends (702) the text data and a session ID to the NLU component 260. The session ID is an identifier generated by the server(s) 120, and used to keep track of processing with respect to a specific utterance. Thus, each time the server(s) 120 processes a new utterance, a unique session ID is created for the respective new utterance.

The server(s) 120 performs (608) NLU on the text data and determines (610), based on the NLU processing, the utterance includes an indication to activate a privacy mode. The indication may be a stand-alone user command or a trigger within a user command as described herein.

The server(s) 120 identifies (612) a user that spoke the utterance using user recognition processes as described herein. The server(s) 120 also determines (614) a unique ID associated with the user, generates (616) a privacy mode flag based on the determination of the indication to activate the privacy mode, and associates (618) the privacy mode flag with the unique ID of the user that spoke the utterance.

According to the process of FIGS. 7A and 7B, the NLU component 260 at this point may send the session ID and the privacy mode flag to the ASR component 250. No such step is involved in the process of FIGS. 8A and 8B. Rather, as illustrated in FIG. 8B, the NLU component 260 determines (708) NLU results based on the text data generated by and received from the ASR component 250, and sends (802) the NLU results, the session ID, the user's unique ID, and the privacy mode flag to a command processing 290.

The command processor 290 receives (714) content responsive to the NLU results, and sends (716) the content to the speech-detection device 110 (or another device indicated in a profile of the user associated with the unique ID), which outputs (718) the content. The command processor 290 also deletes (720) data associated with the session ID.

According to FIGS. 7A and 7B, the process ends with the command processor 290 deleting data. However, the process of FIGS. 8A and 8B does not end in the same manner. Rather, as illustrated in FIG. 8B, the command processor 290 sends the session ID and the privacy mode flag to the ASR component 250 and the NLU component 260. The ASR component 250 then deletes (706) data associated with the session ID, and the NLU component 260 separately deletes (712) data associated with the session ID. The ASR component 250 may delete data prior to the NLU component 260 deleting data, the NLU component 260 may delete data prior to the ASR component 250 deleting data, or the ASR component 250 and the NLU component 260 may simultaneously or substantially simultaneously delete respective data. Alternatively, the command processor 290 may send the session ID and the privacy mode flag to an orchestrator component 297 of the system, and the orchestrator component 297 may delete all stored speech processing data (e.g., generated by the ASR component 250, the NLU component 260, and the command processor 290) associated with the session ID.

FIGS. 9A and 9B illustrate processing of an utterance spoken subsequently to the user activating privacy mode. The speech-detection device 110 receives (602) input audio data corresponding to an utterance. The speech-detection device 110 generates input audio data corresponding to the input audio, and sends (604) the input audio data to the server(s) 120.

The server(s) 120 (e.g., the user recognition component 295) identifies (612) a user that spoke the utterance. The server(s) 120 then determines (614) a unique ID (e.g., user ID) associated with the user. The server(s) 120 may then determine (902) that the user's unique ID is associated with a privacy mode flag. The server(s) 120 may send the privacy mode flag to the ASR component 250.

The ASR component 250 performs (606) ASR on the input audio data to generate text data, and sends (904) the text data, the user's unique ID, and the privacy mode flag to the NLU component 260. The ASR component 250 also deletes (906), based on receiving the privacy mode flag, data used to perform ASR on the input audio data.

The NLU component 260 performs (608) NLU on the text data, and determines (708 illustrated in FIG. 9B) therefrom NLU results. The NLU component 260 sends (908) the NLU results, the user's unique ID, and the privacy mode flag to a command processor 290. The NLU component 260 also deletes (910), based on receiving the privacy mode flag, data used to perform NLU on the text data.

The command processor 290 determines (714) content responsive to the NLU results and sends (716) the content to the speech-detection device 110, which outputs (718) the content to a user. The command processor 290 also deletes (912), based on receiving the privacy mode flag, data used to determine the content.

In general, privacy mode as used herein may involve the sending of generic user IDs to application servers 125. For example, while the system may determine the exact user ID of the user that spoke the utterance in order to properly determine the command in the utterance and the application server(s) 125 from which to get content from, the command processor 290 (or another component of the system) may genericize the user ID into a user group ID, and send the user group ID to the application server(s) 125. The user group ID should be specific to the user enough to obtain relevant results to the command, while at the same time being generic enough that the application server(s) 125 cannot determine the user's identity using the user group ID.

Figure 10:
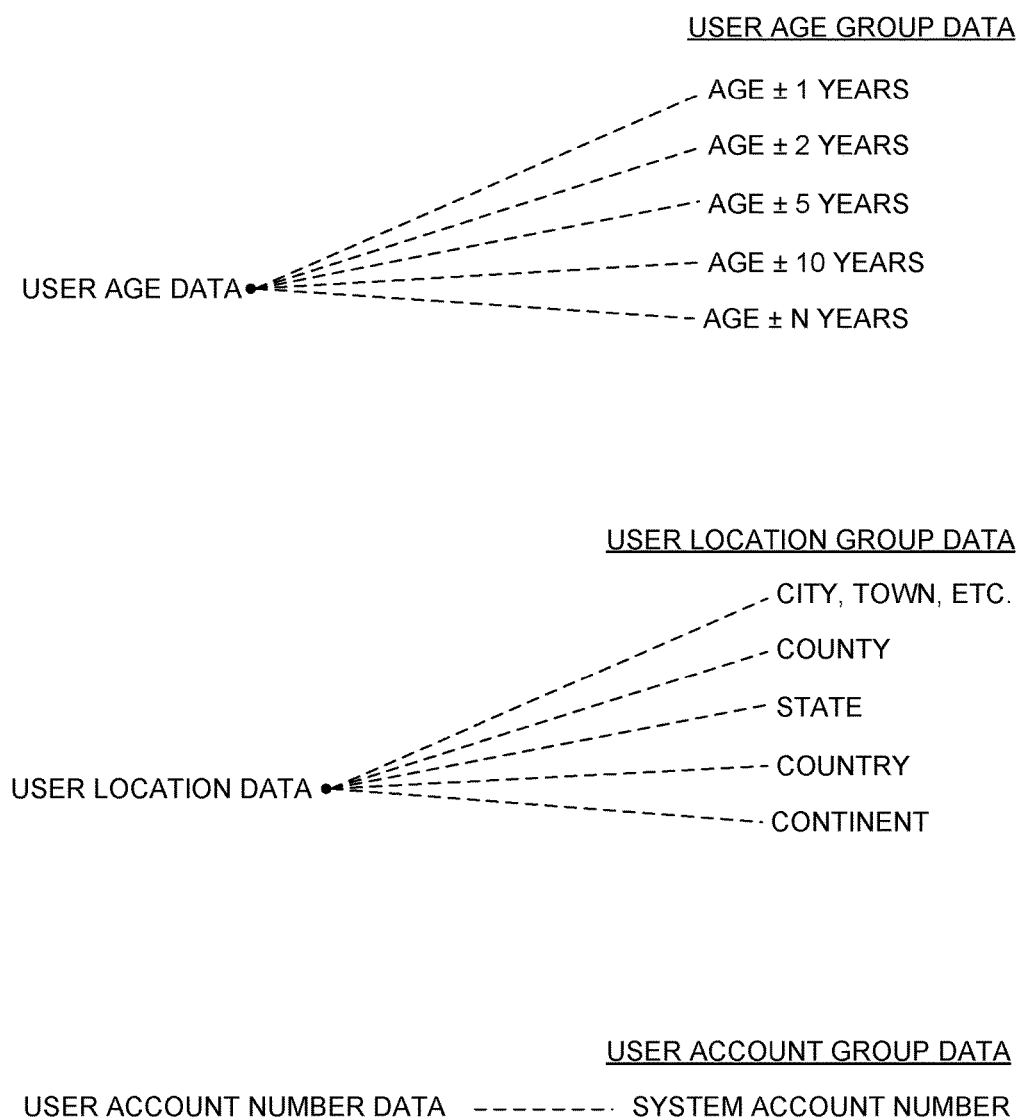
FIG. 10 illustrates the creation of various types of user group data for purposes of generating a user group ID according to embodiments of the present disclosure.

FIG. 10 illustrates the creation of various types of user group data for purposes of generating a user group ID. A user ID may include represent user age data, user location data, user account number data, as well as others.

The user age data represented by the user ID may represent the exact year age (e.g., 30 years old) of the user. The system may genericize the user age data to user age group data for purposes of the user group ID. The user age group data may represent a range of ages that encompasses the user's age. The user age group data may include an age range that is ±1 year of the user's age, ±2 years of the user's age, ±5 years of the user age, ±10 years of the user's age, ±N years of the user's age. For example, if the user age data indicates the user is 30 years old, user age group data created therefrom may indicate an age of the user to be 29-31, 28-32, 25-35, 20-40, etc. The specific age range of the user age group data may be configured based on the application server(s) 125 receiving the user group ID, based on user preferences, and/or based on previous interactions with the application server(s) 125 (e.g., a wider range of ages may be used to ensure user anonymity if the user has interacted with the application server(s) 125 over a threshold amount of times).

The user location data represented by the user ID may represent an exact location of the user (or the speech-detection device with which the user is interacting). The exact location may be as specific as a room of a building, or may be broader depending upon implementation. The system may genericize the user location data to user location group data that is broader than the exact location of the user data. For example, the user location group data may indicate a confined geographic location (e.g., city, town, village, etc.), or a more robust geographic area, such as a county, state country, continent, or the like.

The user account number user data represented by the user ID may represent an account number of the user. Such account number may be specific to a service provided by a specific application server(s) 125. The system may genericize the user account number data to user account number group data that represents a single account number used by the system 100 with respect to interactions with a single service. For example, the system 100 may communicate with a music streaming application server and a ride sharing application server. The system 100 may have a first account used when interacting with the music streaming application server, and a second account used when interacting with the ride sharing application server. The first account may be used for a variety of users interacting with the music streaming application service, and the second account may be used for a variety of users interacting with the ride sharing application server. This ensures individual users remain anonymous to application servers 125, while also ensuring that application servers are paid for the services they provide.

The teachings of the present disclosure may also be used in the context of communications (e.g., calls and messaging) between devices. When privacy mode is not activated, when a recipient device receives an incoming call request or a message from a first device, the recipient device determines a user name in a contact list associated with the device originating the call or message, and displays the user name to the recipient with the incoming call request or the message. According to the present disclosure, if privacy mode is activated with respect to the call or message originating user, the call request or message may be sent to the recipient device along with a privacy mode flag. The privacy mode flag may instruct the recipient device to not display the call or messaging originating user's name to the recipient.

Figure 11:
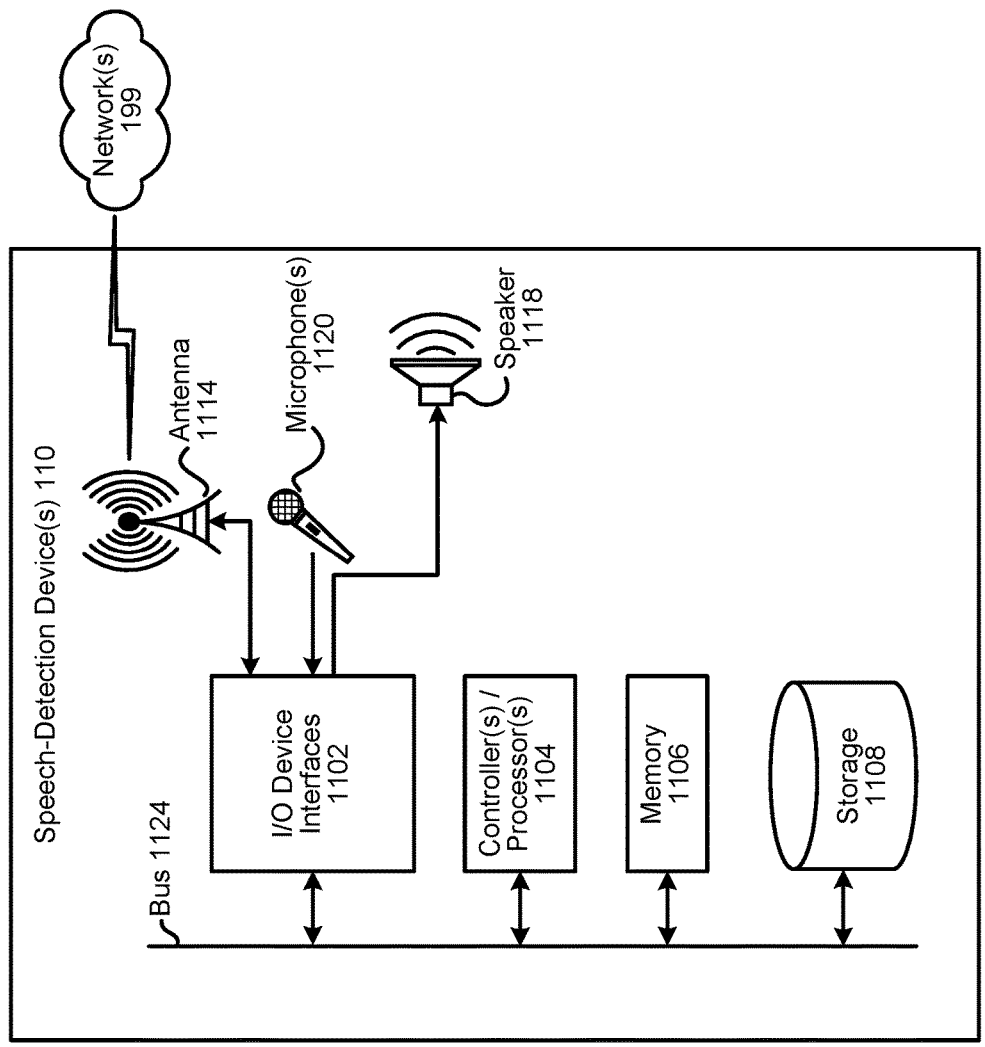
FIG. 11 is a block diagram conceptually illustrating example components of a device according to embodiments of the present disclosure.
Figure 12:
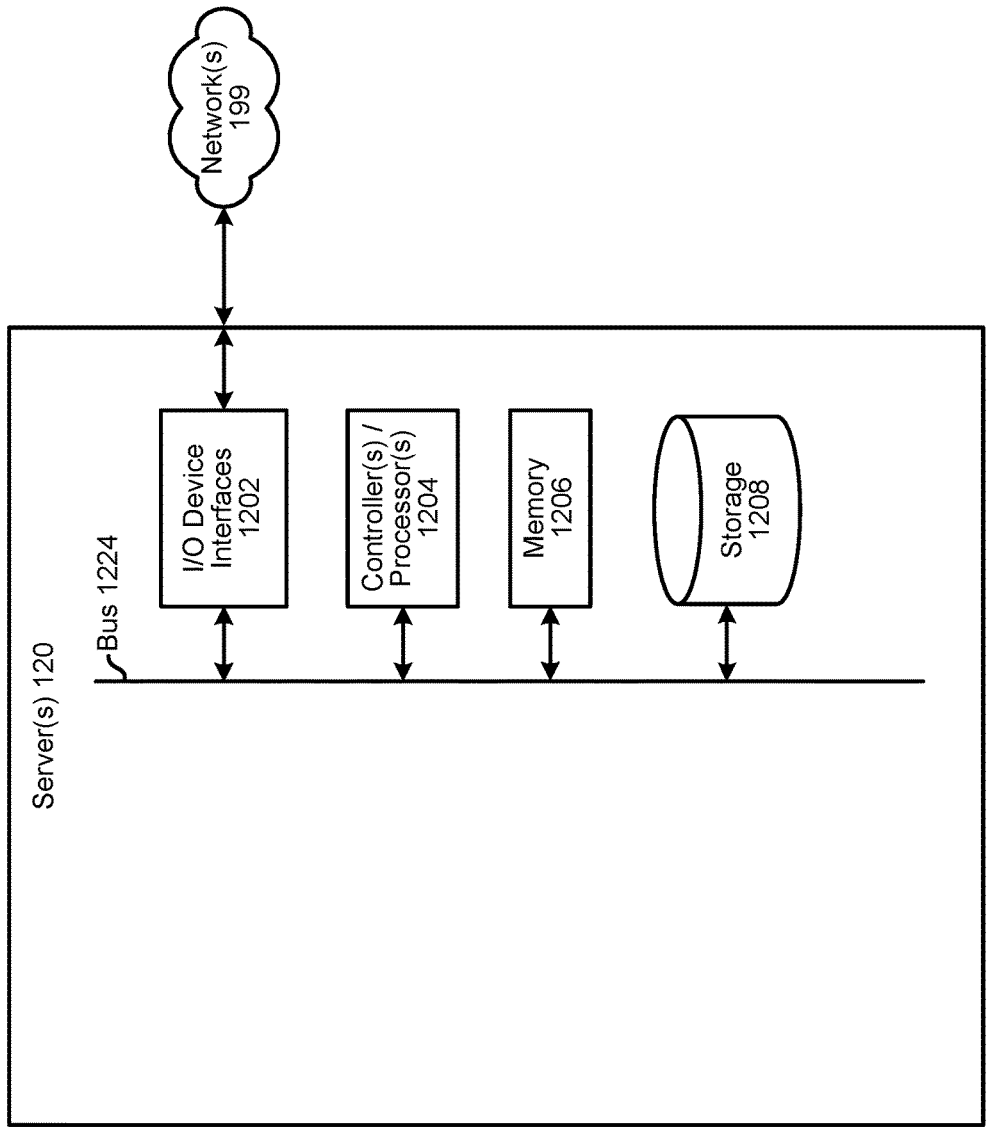
FIG. 12 is a block diagram conceptually illustrating example components of a server according to embodiments of the present disclosure.

FIG. 11 is a block diagram conceptually illustrating a user device that may be used with the described system. FIG. 12 is a block diagram conceptually illustrating example components of a remote device, such as the server(s) 120 that may assist with ASR processing, NLU processing, or command processing. Multiple servers 120 may be included in the system 100, such as one server 120 for performing ASR, one server 120 for performing NLU, etc. In operation, each of these devices (or groups of devices) may include computer-readable and computer-executable instructions that reside on the respective device (110/120), as will be discussed further below.

Each of these devices (110/120) may include one or more controllers/processors (1104/1204), which may each include a central processing unit (CPU) for processing data and computer-readable instructions, and a memory (1106/1206) for storing data and instructions of the respective device. The memories (1106/1206) may individually include volatile random access memory (RAM), non-volatile read only memory (ROM), non-volatile magnetoresistive memory (MRAM), and/or other types of memory. Each device (110/120) may also include a data storage component (1108/1208) for storing data and controller/processor-executable instructions. Each data storage component (1108/1208) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (1102/1202).

Computer instructions for operating each device (110/120) and its various components may be executed by the respective device's controller(s)/processor(s) (1104/1204), using the memory (1106/1206) as temporary "working" storage at runtime. A device's computer instructions may be stored in a non-transitory manner in non-volatile memory (1106/1206), storage (1108/1208), or an external device(s). Alternatively, some or all of the executable instructions may be embedded in hardware or firmware on the respective device in addition to or instead of software.

Each device (110/120) includes input/output device interfaces (1102/1202). A variety of components may be connected through the input/output device interfaces (1102/1202), as will be discussed further below. Additionally, each device (110/120) may include an address/data bus (1124/1224) for conveying data among components of the respective device. Each component within a device (110/120) may also be directly connected to other components in addition to (or instead of) being connected to other components across the bus (1124/1224).

Referring to FIG. 11, the device 110 may include input/output device interfaces 1102 that connect to a variety of components such as an audio output component such as a speaker 1118, a wired headset or a wireless headset (not illustrated), or other component capable of outputting audio. The device 110 may also include an audio capture component. The audio capture component may be, for example, a microphone 1120 or array of microphones, a wired headset or a wireless headset (not illustrated), etc. The microphone 1120 may be configured to capture audio. If an array of microphones is included, approximate distance to a sound's point of origin may be determined by acoustic localization based on time and amplitude differences between sounds captured by different microphones of the array.

Via antenna(s) 1114, the input/output device interfaces 1102 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system 100 may be distributed across a networked environment. The I/O device interface 1102 or 1202 may also include communication components that allow data to be exchanged between devices such as different physical servers in a collection of servers or other components.

The components of the speech-detection device 110 and the server(s) 120 may include their own dedicated processors, memory, and/or storage. Alternatively, one or more of the components of the speech-detection device 110 and the server(s) 120 may have their own dedicated I/O interface (1102/1202), processor(s) (1104/1204), memory (1106/1206), and/or storage (1108/1208) of the speech-detection device 110 and server(s) 120, respectively. Thus, ASR component 250 may have its own I/O interface 1202, processor 1204, memory 1206, and/or storage 1208, NLU component 260 may have its own I/O interface 1202, processor 1204, memory 1206, and/or storage 1208, and so forth for the various components discussed herein.

As noted above, multiple devices may be employed in a single speech processing system. In such a multi-device system, each of the devices may include different components for performing different aspects of the speech processing. The multiple devices may include overlapping components. The components of the device 110 and the server(s) 120, as illustrated in FIGS. 11 and 12, are exemplary, and may be located as a stand-alone device or may be included, in whole or in part, as a component of a larger device or system.

Figure 13:
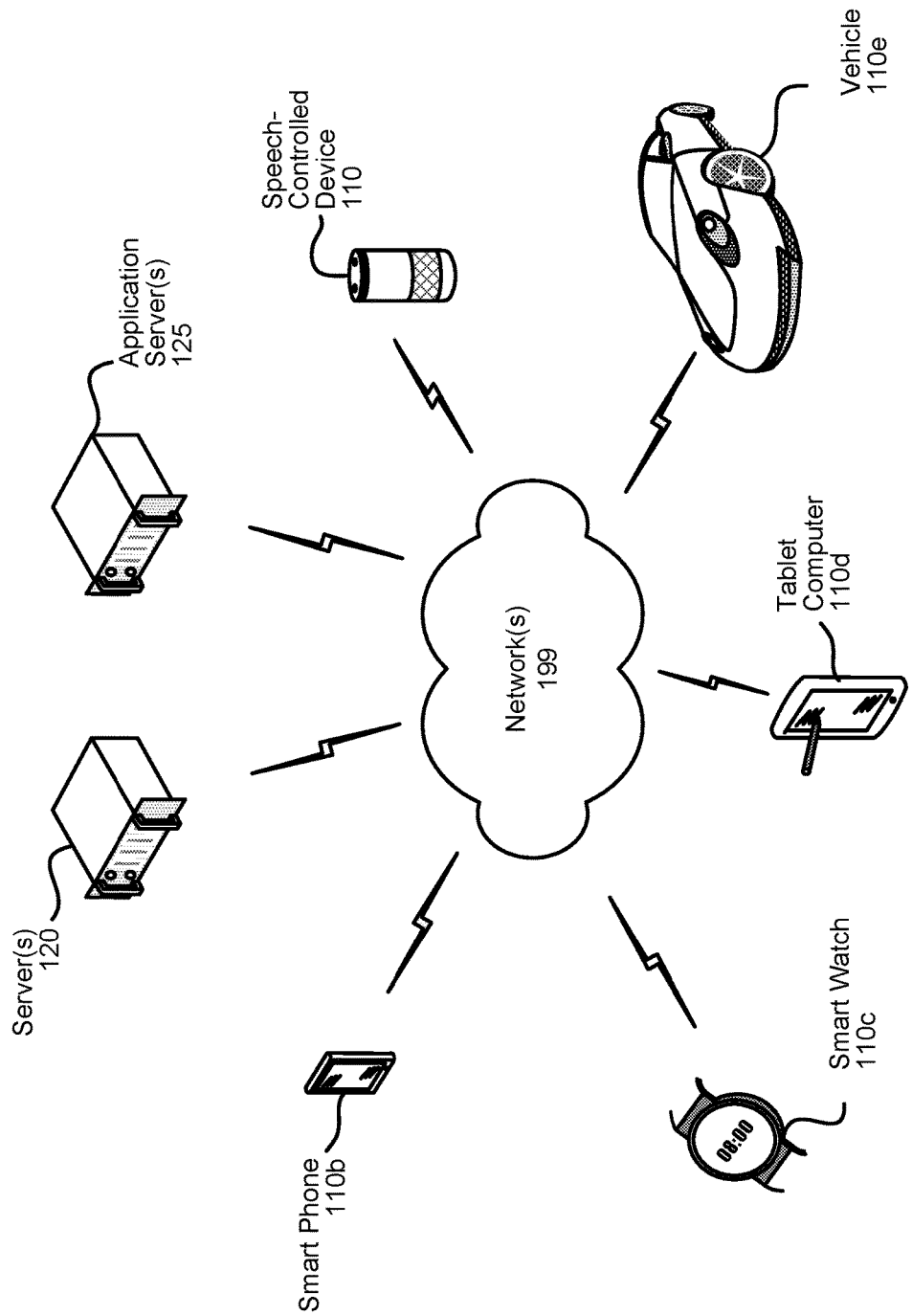
FIG. 13 illustrates an example of a computer network for use with the system.

As illustrated in FIG. 13, multiple devices (110, 110*b*-110*e*, 120, 125) may contain components of the system 100 and the devices may be connected over a network(s) 199. The network(s) 199 may include a local or private network or may include a wide network such as the Internet. Devices may be connected to the network(s) 199 through either wired or wireless connections. For example, the speech-detection device 110, a smart phone 110*b*, a smart watch 110*c*, a tablet computer 110*d*, and/or a vehicle 110*e* may be connected to the network(s) 199 through a wireless service provider, over a WiFi or cellular network connection, or the like. Other devices are included as network-connected support devices, such as the server(s) 120, application developer devices (e.g., the application server(s) 125), or others. The support devices may connect to the network(s) 199 through a wired connection or wireless connection. Networked devices may capture audio using one-or-more built-in or connected microphones or other audio capture devices, with processing performed by ASR, NLU, or other components of the same device or another device connected via the network(s) 199, such as the ASR component 250, the NLU component 260, etc. of one or more servers 120. Other devices may also be connected to the system such as camera(s) or other user identification components, etc.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of one or more of the modules and engines may be implemented as in firmware or hardware, such as the AFE 220, which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
during a first time period:
receiving, from a speech-detection device, input audio data corresponding to a first utterance;
determining audio characteristics of the input audio data;
determining the audio characteristics correspond to stored audio characteristics of a user;
determining a unique identifier (ID) associated with a user profile corresponding to the user;
performing automatic speech recognition (ASR) on the input audio data to generate text data;
performing natural language understanding (NLU) on the text data to generate NLU results;
determining the NLU results correspond to an indication to activate a privacy mode; and
generating a privacy mode flag indicating that the privacy mode is active, the privacy mode flag being associated with the unique ID;
during a second time period subsequent to the first time period:
receiving, from the speech-detection device, second input audio data corresponding to a second utterance;
generating a session ID;
associating the session ID with the second utterance;
performing ASR on the second input audio data to generate second text data;
performing NLU on the second text data to generate second NLU results;
determining the second NLU results correspond to a command;
determining second audio characteristics of the second input audio data;
determining the second audio characteristics correspond to the stored audio characteristics;
associating the session ID with the unique ID;
determining the privacy mode flag associated with the unique ID; and
deleting, based on the privacy mode flag, data associated with the session ID and the unique ID.

2. The computer-implemented method of claim 1, further comprising:
sending, by a NLU component to an orchestrator component, the privacy mode flag and the session ID,
wherein deleting the data includes the orchestrator component deleting ASR generated data associated with the session ID.

3. The computer-implemented method of claim 1, further comprising:
sending the privacy mode flag and the session ID to an orchestrator component;
deleting, by the orchestrator component and in based on the privacy mode flag, ASR data associated with the session ID;
sending the privacy mode flag and the session ID to a NLU component; and
deleting, by the orchestrator component and in based on the privacy mode flag, NLU data associated with the session ID.

4. The computer-implemented method of claim 1, further comprising:
during the second time period:
receiving, from the speech-detection device, third input audio data corresponding to a third utterance;
generating a second session ID;
associating the second session ID with the second utterance;
performing ASR on the third input audio data to generate third text data;
performing NLU on the third text data to generate third NLU results;
determining the third NLU results correspond to a command;
determining third audio characteristics of the third input audio data;
determining the third audio characteristics correspond to second stored audio characteristics of a second user;
determining a second unique ID associated with the second user;
associating the second session ID with the second unique ID
determining the second unique ID is unassociated with a privacy mode flag; and
storing, based on second unique ID being unassociated with a privacy mode flag, data associated with the second session ID.

5. A system, comprising:
at least one processor; and
memory including instructions that, when executed by the at least one processor, cause the system to:
receive, from a device, audio data corresponding to an utterance;
identify a user profile associated with the utterance;
determine a unique ID associated with the user profile;
determine that the utterance corresponds to a command to activate a privacy mode; and
set a privacy mode flag indicating that the privacy mode is active, the privacy mode flag associated with the unique ID.

6. The system of claim 5, wherein the instructions further cause the system to:
receive, from a second device different from the device, second audio data corresponding to a second utterance;
generate a session ID;
associate the session ID with the second utterance;
determine that the user profile is associated with the second utterance;
determine the unique ID associated with the user profile;
determine the unique ID is associated with the privacy mode flag; and
delete, based on determining the unique ID is associated with the privacy mode flag, speech processing data associated with the session ID.

7. The system of claim 6, wherein the instructions further cause the system to:
delete, based on determining the unique ID is associated with the privacy mode flag, automatic speech recognition (ASR) data associated with the session ID and nature language understanding (NLU) data associated with the session ID.

8. The system of claim 7, wherein the instructions further cause the system to:
  delete, based on determining the unique ID is associated with the privacy mode flag, command component data associated with the session ID.

9. The system of claim 5, wherein the instructions further cause the system to:
  receive, from the device, second audio data corresponding to a second utterance;
  generate a session ID;
  associate the session ID with the second utterance;
  determine that the user profile is associated with the second utterance;
  determine the unique ID associated with the user profile;
  determine the unique ID is associated with the privacy mode flag;
  delete, based on determining the unique ID is associated with the privacy mode flag, automatic speech recognition (ASR) data associated with the session ID and natural language understanding (NLU) data associated with the session ID.

10. The system of claim 5, wherein the instructions further cause the system to:
  receive, from the device, second audio data corresponding to a second utterance;
  generate a session ID;
  associate the session ID with the second utterance;
  perform speech processing on the second audio data;
  determine that the user profile is associated with the second utterance;
  determine the unique ID associated with the user profile;
  determine the unique ID is associated with the privacy mode flag; and
  delete, based on the unique ID being associated with the privacy mode flag, speech processing data associated with the session ID.

11. The system of claim 5, wherein the instructions further cause the system to:
  associate the privacy mode flag with a device ID of the device.

12. The system of claim 5, wherein the instructions further cause the system to:
  determine a domain associated with the utterance; and
  associate the privacy mode flag with the domain.

13. A computer-implemented method, comprising:
  receiving, from a device, audio data corresponding to an utterance;
  identifying a user profile associated with the utterance;
  determining a unique ID associated with the user profile;
  determining that the utterance corresponds to a command to activate a privacy mode; and
  setting a privacy mode flag indicating that the privacy mode is active, the privacy mode flag associated with the unique ID.

14. The computer-implemented method of claim 13, further comprising:
  receiving, from a second device different from the device, second audio data corresponding to a second utterance;
  generating a session ID;
  associating the session ID with the second utterance;
  determining that the user profile is associated with the second utterance;
  determining the unique ID associated with the user profile;
  determining the unique ID is associated with the privacy mode flag; and
  deleting, based on determining that the unique ID is associated with the privacy mode flag, speech processing data associated with the session ID.

15. The computer-implemented method of claim 14, further comprising:
  deleting, based on determining the unique ID is associated with the privacy mode flag, automatic speech recognition (ASR) data associated with the session ID and nature language understanding (NLU) data associated with the session ID.

16. The computer-implemented method of claim 15, further comprising:
  deleting, based on determining the unique ID is associated with the privacy mode flag, command component data associated with the session ID.

17. The computer-implemented method of claim 13, further comprising:
  receiving, from the device, second audio data corresponding to a second utterance;
  generating a session ID;
  associating the session ID with the second utterance;
  determining that the user profile is associated with the second utterance;
  determining the unique ID associated with the user profile;
  determining the unique ID is associated with the privacy mode flag;
  deleting, based on determining the unique ID is associated with the privacy mode flag, automatic speech recognition (ASR) data associated with the session ID and natural language understanding (NLU) data associated with the session ID.

18. The computer-implemented method of claim 13, further comprising:
  receiving, from the device, second audio data corresponding to a second utterance;
  generating a session ID;
  associating the session ID with the second utterance;
  performing speech processing on the second audio data;
  determining that the user profile is associated with the second utterance;
  determining the unique ID associated with the user profile;
  determining the unique ID is associated with the privacy mode flag; and
  deleting, based on the unique ID being associated with the privacy mode flag, speech processing data associated with the session ID.

19. The computer-implemented method of claim 13, further comprising:
  associating the privacy mode flag with a device ID of the device.

20. The computer-implemented method of claim 13, further comprising:
  determining a domain associated with the utterance; and
  associating the privacy mode flag with the domain.

* * * * *